(12) United States Patent
Benedict et al.

(10) Patent No.: US 11,479,355 B2
(45) Date of Patent: Oct. 25, 2022

(54) HOVER-CAPABLE FLAPPING-WING AIRCRAFT

(71) Applicant: The Texas A&M University System, College Station, TX (US)

(72) Inventors: Moble Benedict, College Station, TX (US); David A. Coleman, Bryan, TX (US)

(73) Assignee: The Texas A&M University System, College Station, TX (US)

( * ) Notice: Subject to any disclaimer, the term of this patent is extended or adjusted under 35 U.S.C. 154(b) by 176 days.

(21) Appl. No.: 16/762,516

(22) PCT Filed: Dec. 20, 2018

(86) PCT No.: PCT/US2018/066809
§ 371 (c)(1),
(2) Date: May 8, 2020

(87) PCT Pub. No.: WO2019/126507
PCT Pub. Date: Jun. 27, 2019

(65) Prior Publication Data
US 2020/0324892 A1    Oct. 15, 2020

Related U.S. Application Data

(60) Provisional application No. 62/608,528, filed on Dec. 20, 2017.

(51) Int. Cl.
*B64C 33/02*    (2006.01)
*B64C 3/18*    (2006.01)
(Continued)

(52) U.S. Cl.
CPC .............. *B64C 33/02* (2013.01); *B64C 3/185* (2013.01); *B64C 3/26* (2013.01); *B64C 13/18* (2013.01);
(Continued)

(58) Field of Classification Search
CPC ........ B64C 33/00; B64C 33/02; B64C 33/025
See application file for complete search history.

(56) References Cited

U.S. PATENT DOCUMENTS 6,659,397 B1 * 12/2003 Charron .................. B64C 33/02
244/195
8,091,823 B2    1/2012 Park et al.
(Continued)

FOREIGN PATENT DOCUMENTS

CN    101734375 A    6/2010
CN    101734375 B *    6/2012
(Continued)

OTHER PUBLICATIONS

PCT/US2018/066809 International Search Report and Written Opinion dated Apr. 19, 2019 (14 p.).

*Primary Examiner* — Timothy D Collins
*Assistant Examiner* — Justin Michael Heston
(74) *Attorney, Agent, or Firm* — Conley Rose, P.C.

(57) ABSTRACT

A flapping-wing aircraft includes a support frame, a motor coupled to the support frame, a pair of wings coupled to the support frame, and a linkage assembly coupled to the support frame and configured to translate an output torque of the motor into flapping motion of the wings, wherein the linkage assembly includes a first link coupled to a rotational output of the motor, a second link pivotably coupled to the first link at a first pivot joint, a third link pivotably coupled to the second link at a second pivot joint, and a fourth link pivotably coupled to the support frame and slidably coupled to the third link, and wherein the fourth link is coupled to a first wing of the pair of wings.

16 Claims, 21 Drawing Sheets

(51) Int. Cl.
*B64C 3/26* (2006.01)
*B64C 13/18* (2006.01)
*B64C 19/02* (2006.01)
*B64D 27/24* (2006.01)
*F16H 21/40* (2006.01)

(52) U.S. Cl.
CPC .............. *B64C 19/02* (2013.01); *B64D 27/24* (2013.01); *F16H 21/40* (2013.01)

(56) References Cited

U.S. PATENT DOCUMENTS

| | | | |
|---|---|---|---|
| 2003/0230672 A1* | 12/2003 | Charron | B64C 33/02 244/72 |
| 2012/0292438 A1 | 11/2012 | Sreetharan et al. | |
| 2015/0307191 A1* | 10/2015 | Samuel | B64C 39/024 244/22 |

FOREIGN PATENT DOCUMENTS

| | | |
|---|---|---|
| CN | 102815399 A | 12/2012 |
| KR | 20100131683 A | 12/2010 |

\* cited by examiner

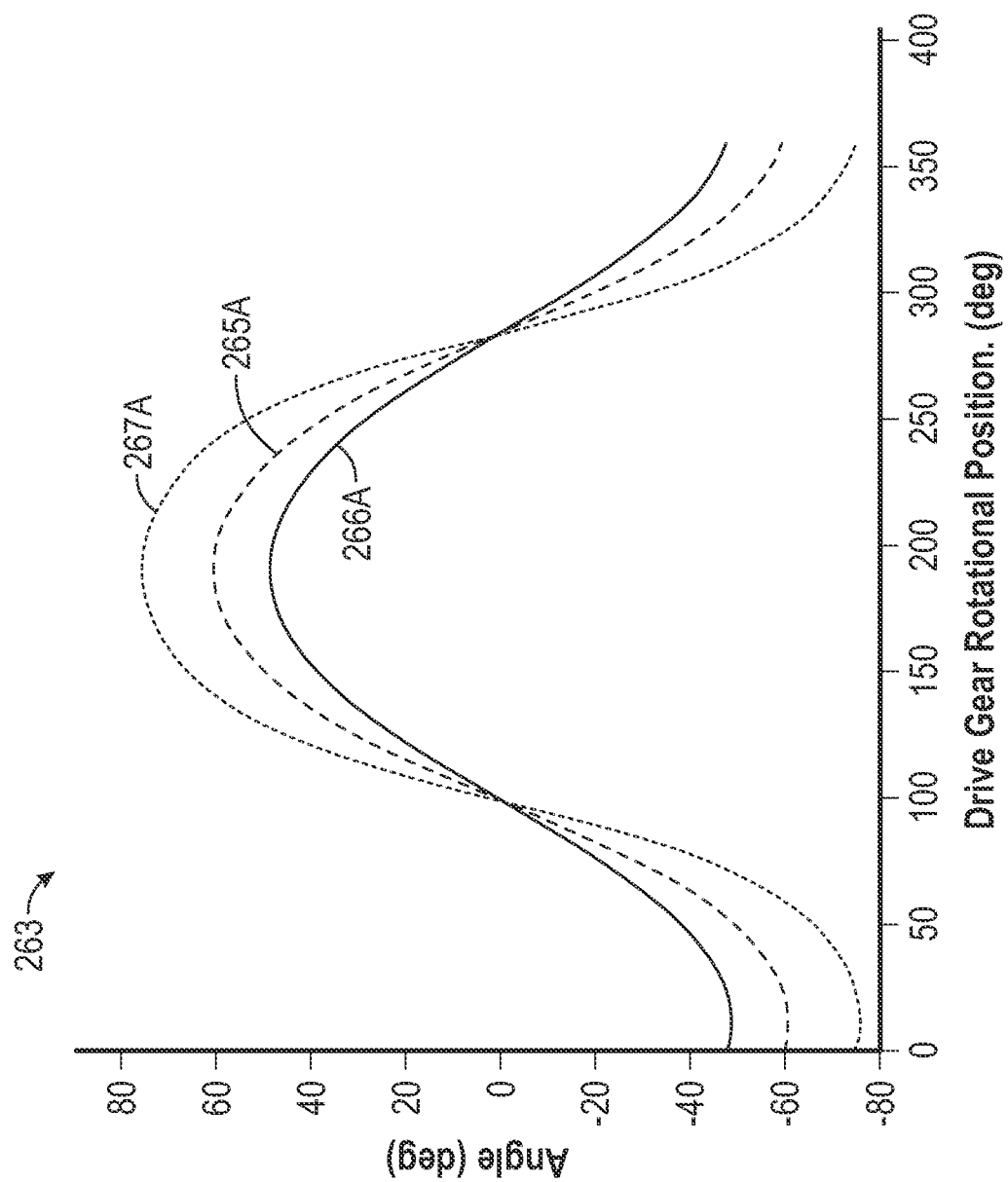

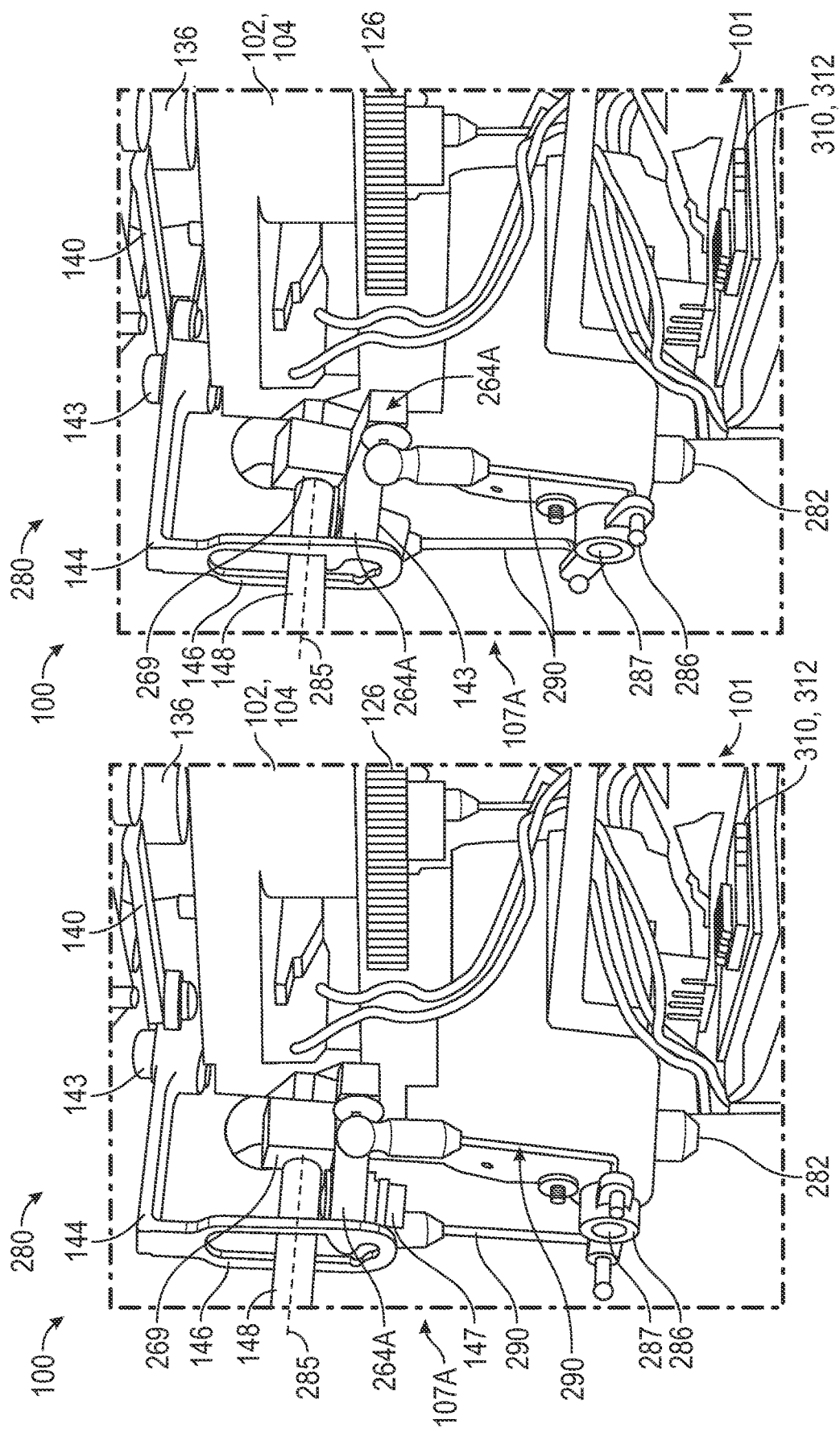

HOVER-CAPABLE FLAPPING-WING AIRCRAFT

CROSS-REFERENCE TO RELATED APPLICATIONS

This application is a 35 U.S.C. § 371 national stage application of PCT/US2018/066809 filed Dec. 20, 2018, and entitled "Hover-Capable Flapping-Wing Aircraft," which claims benefit of U.S. provisional patent application Serial No. 62/608,528 filed Dec. 20, 2017, and entitled "Hover-Capable Flapping-Wing Aircraft," each of which is hereby incorporated herein by reference in their entirety for all purposes.

STATEMENT REGARDING FEDERALLY SPONSORED RESEARCH OR DEVELOPMENT

Not applicable.

BACKGROUND

Biomimetic, hover-capable mechanical flyers are one of the most challenging and fascinating aircraft in the development arena of new and novel micro air vehicle (MAV) platforms. While the flight line is dominated by multi-copter aircraft utilizing fixed, continuously rotating rotors, biologically-inspired two-winged, flapping-wing systems are being developed back in research hangars out of interest in the superior flight capabilities of natural flyers like hummingbirds, honeybees and fruit flies. The flight capabilities potentially offered by flapping-wing systems include large accelerations, high maneuverability and agility in tight spaces, and gust tolerance, demonstrated repeatedly during high speed transitions between flowers swaying in the breeze and point hovering in space.

The ability to change the direction of the lift instantaneously gives biological systems these capabilities, which rotary wing platforms are so far unable to achieve, reducing maneuverability and gust rejection. Beyond these issues, low Reynolds number conventional rotors generally have degraded performance and can be quite susceptible to aerodynamic disturbances. On the other hand, flying robots that mechanically mimic two-winged biological flight have the potential for having the same exceptional flight capabilities as flapping-wing natural flyers. Thus robotic hummingbird platforms may be an exceptionally capable system for civilian or military missions that require extreme flying performance. Such operations could include tasks such as infrastructure inspection or crop surveillance and soil mapping over a wide range of wind conditions which is currently infeasible with rotary wing systems. Search and rescue operations for law enforcement purposes or in disaster relief efforts can be more efficient with an agile, robust aerial vehicle. Additionally, clandestine surveillance operations in constrained environments can be done routinely with flapping wing systems, since they generate significantly lower noise levels than rotors. This reduced acoustic signature on a quiet, natural looking system can make wildlife monitoring remarkably stress-free and non-disruptive. Because flapping wings naturally operate in low Reynolds number unsteady flow regimes, problems associated with aerodynamic degradation of the flow on conventional small-scale rotors are mitigated or eliminated, and aerodynamic performance are enhanced.

BRIEF SUMMARY OF THE DISCLOSURE

An embodiment of a flapping-wing aircraft comprises a support frame, a motor coupled to the support frame, a pair of wings coupled to the support frame, and a linkage assembly coupled to the support frame and configured to translate an output torque of the motor into flapping motion of the wings, wherein the linkage assembly comprises a first link coupled to a rotational output of the motor, a second link pivotably coupled to the first link at a first pivot joint, a third link pivotably coupled to the second link at a second pivot joint, and a fourth link pivotably coupled to the support frame and slidably coupled to the third link, and wherein the fourth link is coupled to a first wing of the pair of wings. In some embodiments, the third link is pivotably coupled to the support frame at a third pivot joint and the fourth link is coupled to the support frame at a fourth pivot joint. In some embodiments, the third link is pivotable about the third pivot joint at a first stroke amplitude and the fourth link is pivotable about the fourth pivot joint at a second stroke amplitude that is greater than the first stroke amplitude. In certain embodiments, an end of the third link comprises a slider through which the fourth link extends. In certain embodiments, the flapping-wing aircraft comprises a yaw actuation assembly coupled to the support frame and configured to adjust a yaw moment about a vertical axis extending through a center of gravity of the flapping-wing aircraft, wherein the yaw actuation assembly comprises a yaw servo and a wing mount coupled to the first wing, and wherein the yaw servo is configured to rotate the wing mount about a pitch axis. In some embodiments, the flapping-wing aircraft comprises a pitch actuation assembly coupled to the support frame and configured to adjust a pitch moment about a lateral axis of the flapping-wing aircraft, wherein the pitch actuation assembly comprises a pivot shaft comprising having a rotational axis and comprising an offset shaft having an offset axis that is spaced from the rotational axis, wherein the third pivot joint is coupled to the offset shaft, a swing arm coupled to the support frame, a pitch yolk coupled between the swing arm and the pivot shaft, wherein the pivot shaft is configured to adjust an offset between an aerodynamic center of the first wing and the lateral axis in response to rotation of the swing arm. In some embodiments, the fourth pivot joint comprises a wing root of the first wing, and wherein the first wing comprises a leading edge spar extending from the wing root, a flexible shim coupled to the wing root, a root spar coupled to the flexible shim, wherein the root spar comprises a material having a greater stiffness than a material comprising the flexible shim, and a flexible skin stretched over the leading edge spar and the root spar.

An embodiment of a flapping-wing aircraft comprises a support frame, a motor coupled to the support frame, a pair of wings coupled to the support frame, a linkage assembly coupled to the support frame and configured to translate an output torque of the motor into flapping motion of the wings, and a yaw actuation assembly coupled to the support frame and configured to adjust a yaw moment about a vertical axis extending through a center of gravity of the flapping-wing aircraft, wherein the yaw actuation assembly comprises a yaw servo and a wing mount coupled to a first wing of the pair of wings, wherein the yaw servo is configured to rotate the wing mount about a pitch axis. In some embodiments, the yaw actuation assembly further comprises a swing arm coupled to a yaw servo that is coupled to the support frame, and a pair of pitch links coupled between the swing arm and the wing mounts, wherein the pitch links are configured to rotate the wing mount about the pitch axis in response to rotation of the swing arm. In certain embodiments, the flapping-wing aircraft comprises a roll actuation assembly coupled to the support frame and configured to adjust a roll moment about a longitudinal axis of the flapping-wing aircraft, wherein the roll actuation assembly comprises a roll servo coupled to the support frame, a roll swing arm coupled to the roll servo, a roll bar coupled to the roll swing arm and to a wing mount coupled to the first wing, wherein the roll bar and the wing mount are each slidable along a longitudinal axis of the roll bar in response to rotation of the roll swing arm. In certain embodiments, the flapping-wing aircraft comprises an autopilot coupled to the support frame and configured to control the actuation of the yaw servo and the roll servo. In some embodiments, the linkage assembly comprises a first link coupled to a rotational output of the motor, a second link pivotably coupled to the first link at a first pivot joint, a third link pivotably coupled to the second link at a second pivot joint, and a fourth link pivotably coupled to the support frame and slidably coupled to the third link, and wherein the fourth link is coupled to a first wing of the pair of wings. In some embodiments, the flapping-wing aircraft comprises a pitch actuation assembly coupled to the support frame and configured to adjust a pitch moment about a lateral axis of the flapping-wing aircraft, wherein the pitch actuation assembly comprises a pivot shaft comprising having a rotational axis and comprising an offset shaft having an offset axis that is spaced from the rotational axis, wherein the third pivot joint is coupled to the offset shaft, a swing arm coupled to the support frame, and a pitch yolk coupled between the swing arm and the pivot shaft, wherein the pivot shaft is configured adjust an offset between an aerodynamic center of the first wing and the lateral axis in response to rotation of the swing arm. In some embodiments, each of the pair of wings comprises a wing root coupled to the linkage assembly, a leading edge spar extending from the wing root, a flexible shim coupled to the wing root, a root spar coupled to the flexible shim, wherein the root spar comprises a material having a greater stiffness than a material comprising the flexible shim, and a flexible skin stretched over the leading edge spar and the root spar.

An embodiment of a flapping-wing aircraft comprises a support frame, a motor supported by the support frame, a pair of wings supported by the support frame, and a linkage assembly supported by the support frame and configured to translate an output torque of the motor into flapping motion of the wings, wherein each of the pair of wings comprises a wing root coupled to the linkage assembly, a leading edge spar extending from the wing root, a flexible shim coupled to the wing root, a root spar coupled to the flexible shim, wherein the root spar comprises a material having a greater stiffness than a material comprising the flexible shim, and a flexible skin stretched over the leading edge spar and the root spar. In some embodiments, the material comprising the flexible shim of each of the pair of wings is prepreg carbon fiber, and the flexible skin comprises a foam membrane. In some embodiments, each of the pair of wings further comprises a cross spar that is adhered to the flexible skin. In certain embodiments, the flapping-wing aircraft comprises a yaw actuation assembly coupled to the support frame and configured to adjust a yaw moment about a vertical axis extending through a center of gravity of the flapping-wing aircraft, wherein the yaw actuation assembly comprises a yaw servo and a wing mount coupled to a first wing of the pair of wings, wherein the yaw servo is configured to rotate the wing mount about a pitch axis. In certain embodiments, the linkage assembly comprises a first link coupled to a rotational output of the motor, a second link pivotably coupled to the first link at a first pivot joint, a third link pivotably coupled to the second link at a second pivot joint, and a fourth link pivotably coupled to the support frame and slidably coupled to the third link, and wherein the fourth link is coupled to a first wing of the pair of wings. In some embodiments, the flapping-wing aircraft comprises a pitch actuation assembly coupled to the support frame and configured to adjust a pitch moment about a lateral axis of the flapping-wing aircraft, wherein the pitch actuation assembly comprises a pivot shaft comprising having a rotational axis and comprising an offset shaft having an offset axis that is spaced from the rotational axis, wherein the third pivot joint is coupled to the offset shaft, a swing arm coupled to the support frame, and a pitch yolk coupled between the swing arm and the pivot shaft, wherein the pivot shaft is configured adjust an offset between an aerodynamic center of the first wing and the lateral axis in response to rotation of the swing arm.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of exemplary embodiments of the invention, reference will now be made to the accompanying drawings in which:

FIG. 14 is a graph illustrating flap angle amplitudes of the pair of wings of the flapping-wing aircraft of FIG. 1 versus drive gear rotational position of the motor of the flapping-wing assembly of FIG. 1;

FIG. 15B is a perspective view of the yaw actuation assembly of FIG. 15A in a second position;

FIG. 15C is a perspective view of the yaw actuation assembly of FIG. 15A in a third position;

DETAILED DESCRIPTION OF THE PREFERRED EMBODIMENTS

Figure 1:
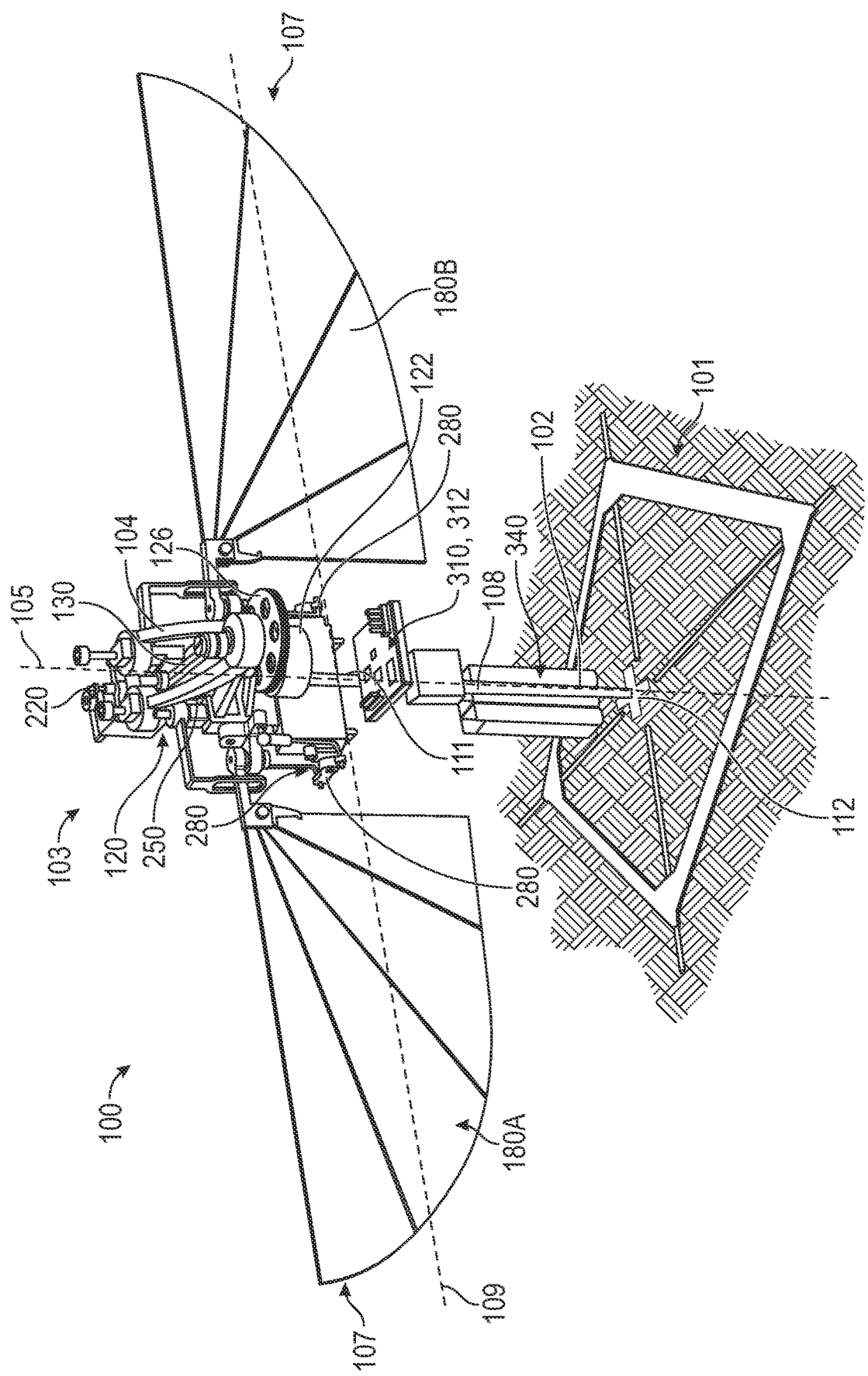
FIG. 1 is a perspective view of an embodiment of a flapping-wing aircraft in accordance with principles disclosed herein.
Figure 2:
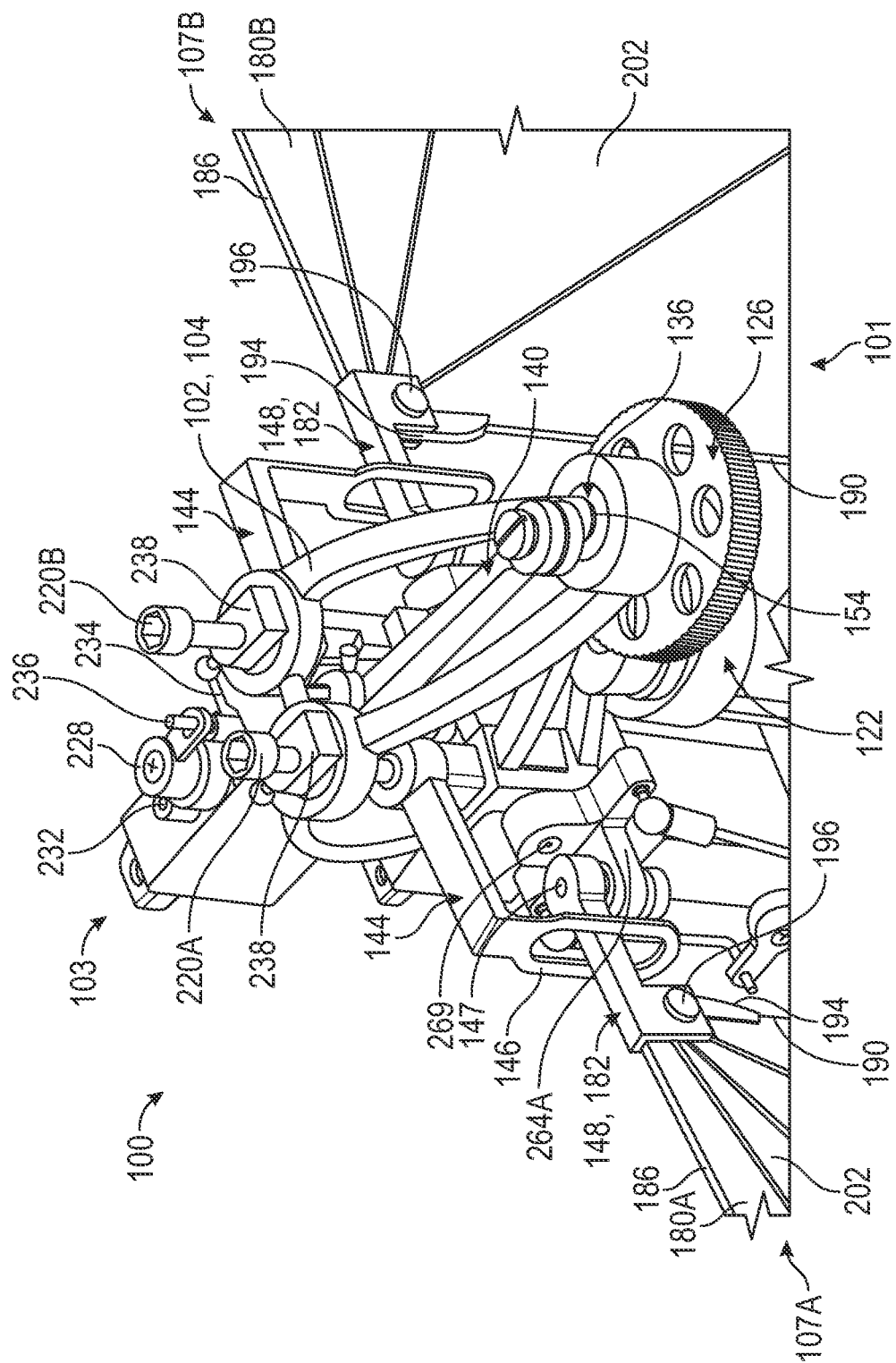
FIG. 2 is a zoomed-in perspective view of the flapping-wing aircraft of FIG. 1.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct engagement between the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

The present disclosure is directed towards the construction and operation of hover-capable flapping-wing aircraft. Particularly, the present disclosure is directed towards non-human powered micro-air-vehicles (MAVs) that comprise hover-capable flapping-wing aircraft. In embodiments, the flapping-wing aircraft disclosed herein utilize the latest advances in lightweight composites, micro-electronics, and batteries, enabling designers to miniaturize the aircraft down to an acceptable size for flapping flight mimicking that of a hummingbird. Importantly, biological flapping wing flight offers superior maneuverability, gust tolerance, and disturbance rejection capabilities compared to rotary powered aircraft employing fixed wings. The advantages of flapping-wing aircraft may be because flapping wing aerodynamics involve several unsteady phenomena (such as leading edge vortices (LEVs)) at low Reynolds numbers that significantly enhance lift production. Extensive computational and experimental work further support the presence of lift coefficients on flapping wings much higher than that experienced by rotors and fixed wings.

Although there have been a few successful flapping-wing MAVs built and flown, conventional flapping-wing MAVs have several characteristics which limit their similarity with hovering biological flyers. The present disclosure is directed towards biologically inspired two-winged hover-capable MAVs with mechanical simplicity that implements biomimetic wing kinematic modulation techniques for control and stability. The control methodologies disclosed herein include flap plane tilting, amplitude modulation, and mean flapping stroke angle control, which are similar to the methods used by hummingbirds and other two-winged hover-capable flyers for stability and maneuvering. Embodiments of flapping-wing aircraft disclosure herein have a wingspan of about 30 centimeters (cm), flap at about 21 Hertz (Hz), have a mass about 60-65 grams, which is heavier than even the "Giant hummingbird", the world's heaviest hummingbird. Not intending to be bound by any theory, the Reynolds number at which the flapping-wing aircraft disclosed herein may be calculated by relating the wing length, flapping frequency, and flap amplitude, as shown in Equation (1) below where Re is the Reynolds number, $\zeta_L$ is the flap stroke amplitude (in degrees) of a left wing of the flapping-wing aircraft, f is the flapping frequency of the flapping-wing aircraft, $R_w$ is the wing length of the flapping-wing aircraft, v is the kinematic viscosity of air, and AR is the aspect ratio of the flapping-wing aircraft:

$$Re = \frac{4\zeta_L f R_w^2}{vAR} \quad (1)$$

In the embodiments of flapping-wing aircraft disclosed herein, $\zeta_L$ is about 108-112 degrees, f is about 20-25 Hz, $R_w$ is about 12-15 cm, and AR is about 3.5-3.8, and v is about $1.48 \times 10^{-5}$ meters squared per second (m²/s), providing a Re of about $5.9 \times 10^4$ at operational conditions, which is at the lower end of the bird and represents an MAV flight regime. The following sections outline in detail the design and development of embodiments of wings, flapping mechanisms, and wing kinematic modulation mechanisms of embodiments disclosed herein. Using a custom built kinematic autopilot with closed loop control, prototypes of embodiments disclosed herein have been flown successfully, and the results of these flight tests are presented as well.

Referring to FIGS. 1-9, an embodiment of a flapping-wing aircraft 100 is shown. Flapping-wing aircraft 100 comprises a flapping-wing MAV and generally includes a support frame or fuselage 102, a powertrain or flapping drive assembly 120, a pair of wings 180A, 180B, a pitch actuation assembly 220, a roll actuation assembly 250, a yaw actuation assembly 280, a control system 310 including an on-board autopilot 312, and a power supply 340. Flapping-wing aircraft 100 has a front 101, a rear 103 opposite front 101, a pair of opposing lateral sides 107A, 107b, a vertical axis 105, and a lateral or pitch axis 109 which extends through a center of gravity (CG) 111 of the flapping-wing aircraft 100, the lateral axis 109 extending orthogonally to and intersecting the vertical axis 105.

The support frame 102 of flapping-wing aircraft 100 generally includes an upper body 104, an elongate support rod 108, and a landing gear 112. The components of support frame 102, including upper body 104, support rod 108, and landing gear 112 are configured to minimize the overall mass of flapping-wing aircraft 100 while maintaining the necessary strength to withstand the large forces imposed during flapping, and thus, each component of support frame 102 is configured to maximize the strength-to-weight ratio of the given component. In the embodiment of FIGS. 1-9, support frame 102 has a total mass of only about 9.3-9.7 grams.

Upper body 104 of support frame 102 provides an anchor point for the mechanical subsystems of flapping-wing aircraft 100, including the drive assembly 120, and actuation assemblies 220, 250, and 280. Using specially designed arches and reinforcements at stress concentration points, upper body 104 is configured to be as light as possible while maintaining the necessary structural integrity for high amplitude dynamic loads. In the embodiment of FIGS. 1-9, upper body 104 has a mass of about 4-5 grams and is rapid prototyped out of a strong, low-density Nylon-based material. Support rod 108 is coupled between upper body 104 and landing gear 112 and is configured to physically the support the remainder of the subsystems of flapping-wing aircraft 100, including autopilot 312, power supply 340, and landing gear 112. In this embodiment, support rod 108 comprises a carbon fiber rod having a diameter of about 2.7-2.9 millimeters (mm). Landing gear 112 is positioned at a lower end of flapping-wing aircraft 100 and provides a base for supporting flapping-wing aircraft 100 in an upright position when aircraft 100 is not in flight.

The drive assembly 120 of flapping-wing aircraft 100 is configured to flap wings 180A, 180B of aircraft 100 at a large enough stroke amplitude and at a high enough frequency to provide sufficient thrust for producing hovering flight of flapping-wing aircraft 100. Particularly, drive assembly 120 is configured to maximize the stroke amplitude of wings 180A, 180B in order to reduce the disk loading and also to lower the required operational flapping frequency of wings 180A, 180B. In conventional flapping-wing aircraft a 4-bar mechanism is typically employed; however, due to the maximum angle limitations of the 4-bar mechanism, 4-bar mechanisms are typically not capable of providing sufficient thrust for hovering flight. Therefore, the drive assembly 120 of flapping-wing aircraft 100, employs a 5-bar linkage to increase the stroke amplitude of wings 180A, 180B.

Particularly, drive assembly 120 includes a motor 122, a transmission 126 coupled to the output of motor 122, and a 5-bar linkage assembly 130 coupled between transmission 126 and wings 180A, 180B. In this embodiment, drive assembly 120 has a total mass of about 16.6-16.8 grams; however, in other embodiments, the mass of drive assembly 120 may vary. Linkage assembly 130 includes a first link 132, a second link 136, a third link 140, a pair of fourth links 144, and a pair of fifth links 148. Linkage assembly 130 is generally configured to translate an output torque of motor 122 into flapping motion of wings 180A, 180B. Motor 122 is configured to provide a rotational torque at a given rotational speed, which is received by transmission 126. Transmission 126, upon receiving rotational torque from motor 122, rotates second link 136 about an axis of rotation 134 aligned with an output shaft of transmission 126. In this embodiment, transmission 126 comprises a reduction or drive gear having a gear ratio of about 9.0:1-9.5:1; however, in other embodiments, the gear ratio of the drive gear may vary. In embodiments, link 136 may be referred to as a first link 136, link 140 may be referred to second link 140, link 144 may be referred to as third link 144, and link 148 may be referred to as fourth link 148; however, in the interest of clarity, links 136, 140, 144, and 148 are referred to in the disclosure below as second link 136, third link 140, fourth link 144, and fifth link 148.

Figure 3:
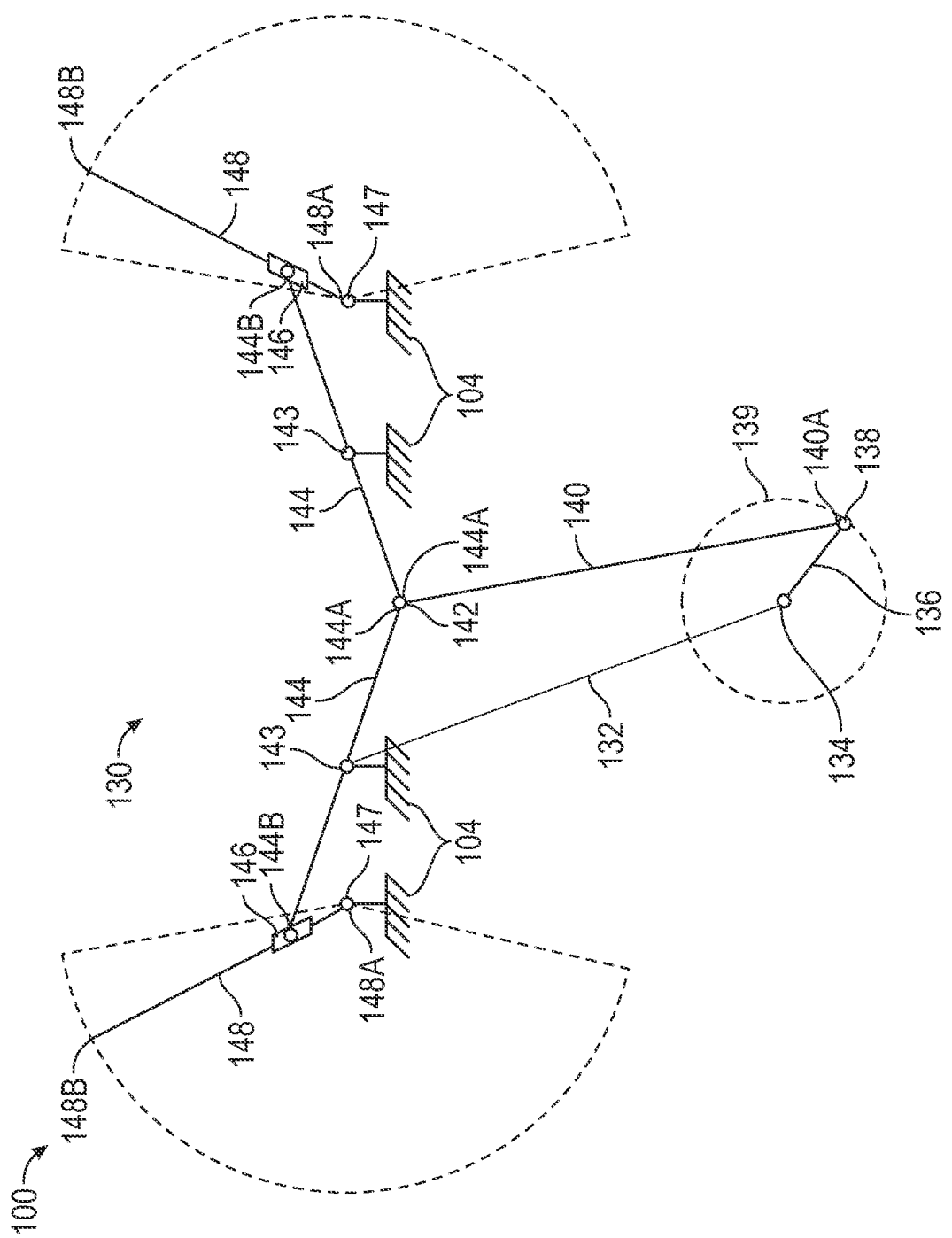
FIGS. 3-5 are schematic views of an embodiment of a linkage system of the flapping-wing aircraft of FIG. 1 in accordance with principles disclosed herein.
Figure 4:
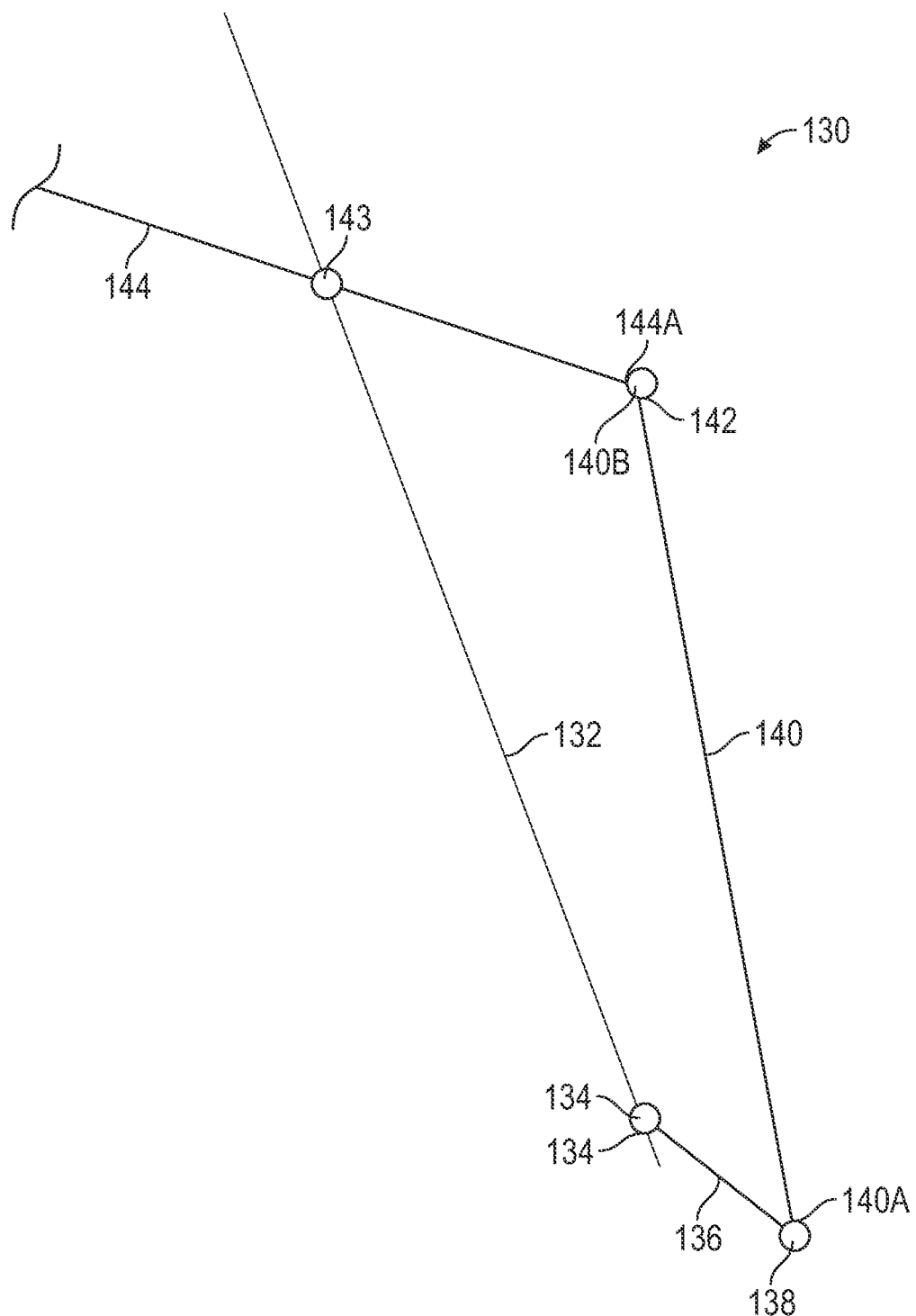
Figure 5:
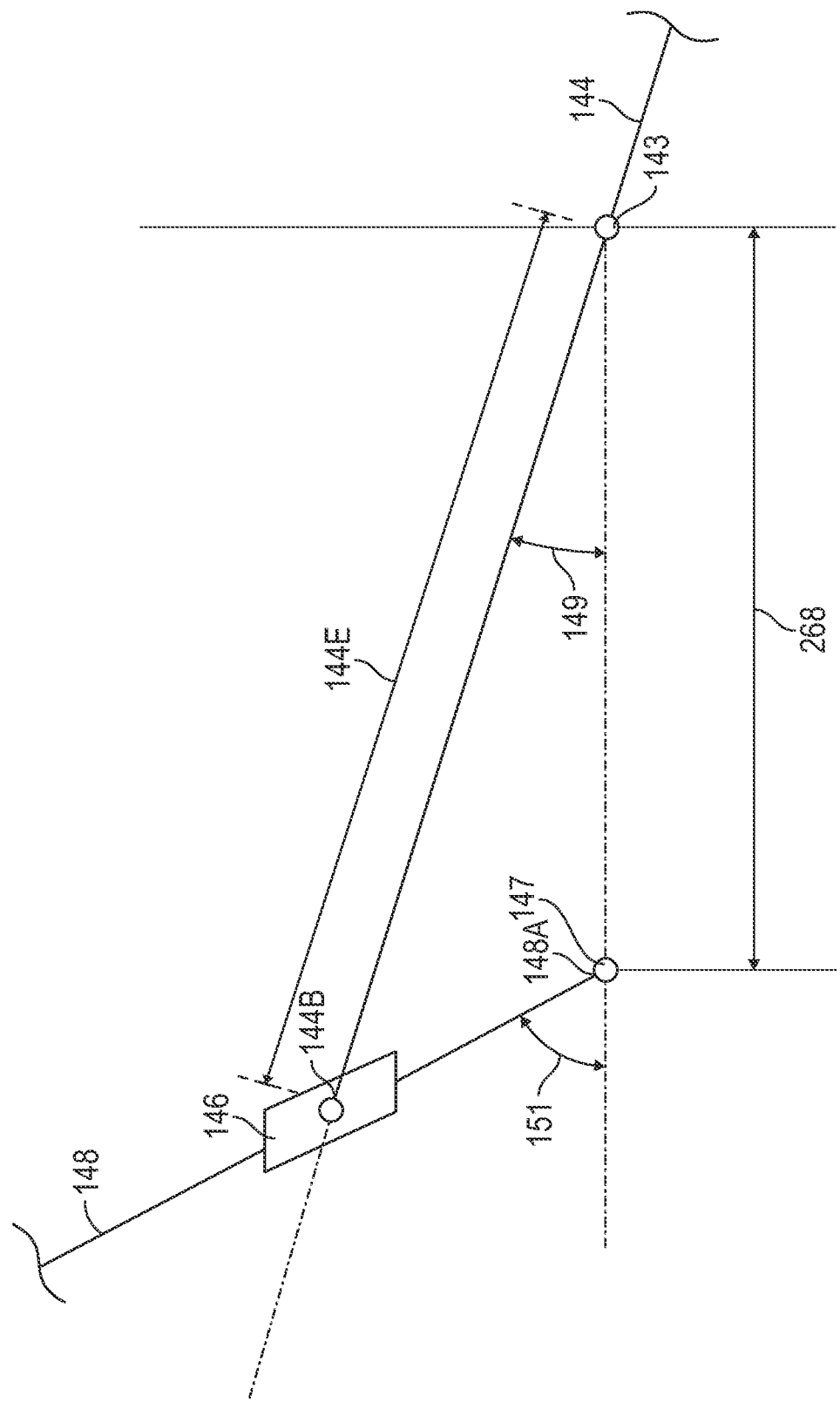

As shown particularly in FIGS. 3-5, a first or radially inner end 136A of second link 136 is coupled to the output shaft of transmission 126 at the rotational axis 134 while a second end 136B of second link 136 is pivotably coupled to a first end 140A of third link 140 at a first pivot joint 138. In response to rotation of the output shaft of transmission 126, first pivot joint 138 rotates about a circumference 139 defined by the length of second link 136. In this embodiment, second link 136 has a length of about 2.5-2.6 mm; however, in other embodiments the length of second link 136 may vary. A second end 140B of third link 140 is pivotably coupled to a first end 144A of each fourth link 144 at a second pivot joint 142. In this embodiment, third link 140 has a length of about 28.5-29.5 mm; however, in other embodiments the length of third link 140 may vary.

Fourth links 144 of linkage assembly 130 are pinned or pivotably coupled to the upper body 104 of support frame 102 at a pair of third pivot joints 143. Additionally, each fourth link 144 has a second end 144B that comprises a slider or slidable connector 146 that slidably coupled the second end 144B of each fourth link 144 with one of the fifth links 148 of linkage assembly 130. In this embodiment, each fourth link 144 has a length of about 6.3-6.4 mm; however, in other embodiments the length of each fourth link 144 may vary. Each fourth link 144 has an extension length 144E extending between third pivot joint 143 and the second end 144B of the fourth link 144. In this embodiment, the extension length 144E of each fourth length is about 20.2-20.4 mm; however, in other embodiments the extension length 144E of each fourth link 144 may vary. First link 132 of linkage assembly 130 comprises the length between each third pivot joint 143 and rotational axis 134. In this embodiment, first link 132 has a length of about 29.6-29.8 mm; however, in other embodiments, the length of first link 132 may vary.

Fifth links 148 of linkage assembly 130 each have a first end 148A pinned or pivotably coupled with the upper body 104 of support frame 102 at a pair of fourth pivot joints 147. During operation of drive assembly 120, fourth links 144 pivot about third pivot joints 143 as third link 140 is displaced by the movement of second link 136. As fourth links 144 pivot about third pivot joints 143 to provide a first output angle 149 of each fourth link 144 that varies based on the angular orientation of the transmission 126. Additionally, the sliders 146 of fourth links 144 slide along the lengths of fifth links 148, thereby pivoting fifth links 148 about fourth pivot joints 147 to provide a second output angle 151 of each fifth link 148 that varies based on the angular orientation of the transmission 126.

Figure 6:
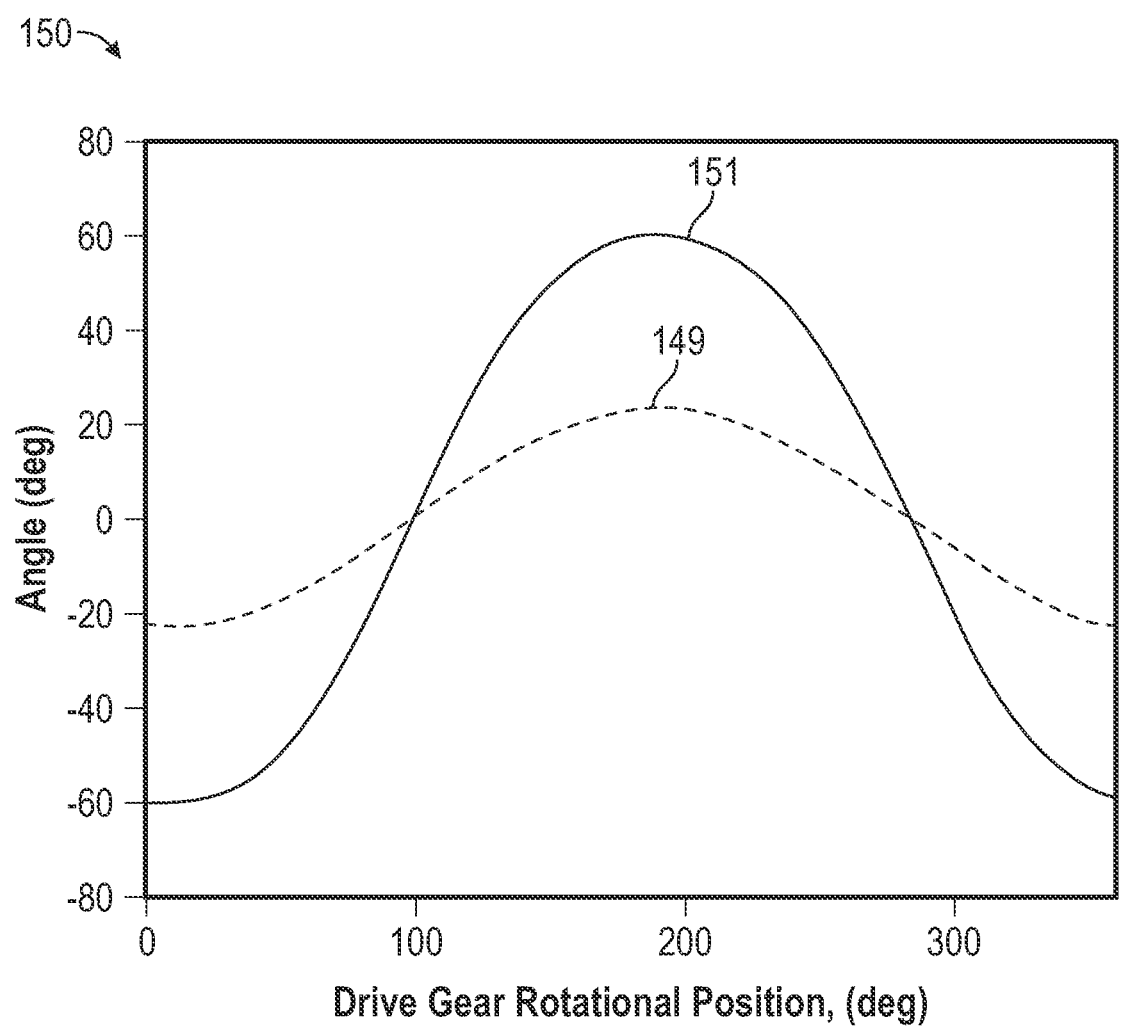
FIG. 6 is a graph illustrating output angle versus drive gear rotational position of a motor of the flapping-wing assembly of FIG. 1 for components of the linkage assembly of FIGS. 3-5.

The sliding connection formed between sliders 146 of fourth links 144 and fifth links 148 amplifies the stroke amplitude of fifth links 148 such that the stroke amplitude of each fifth link 148 is greater than the stroke amplitude of each fourth links 144. FIG. 6 includes a graph 150 illustrating the output angles 149, 151 of each fourth link 144 and fifth link 148, respectively, as a function of the angular orientation of the transmission or drive gear 126. As shown in graph 150, the output angle 149 of fourth links 144 (the output bar in a conventional 4-bar linkage) has about ±20 degrees (deg) of stroke amplitude whereas the output angle 151 of fifth links 148 (the output bar in the 5-bar linkage assembly 130) has about ±60 deg of stroke amplitude, and thus, in this embodiment, the addition of fifth links 148 results in a threefold amplification of the output stroke amplitude of linkage assembly 130. In this embodiment, the maximum second output angle 151 of fifth links 148 is about 55 deg with an error of about ±5 deg due to the mechanical play between fourth links 144 and fifth links 148.

In this embodiment, the links 136, 140, and 144 of linkage assembly 130 are machined from 6061 and 7075 aluminum and pivot joints 138, 142, 143, and 147 comprise steel ball bearings; however, in other embodiments, the configuration of links 136, 140, and 144 and pivot joints 138, 142, 143, and 147 may vary. Motor 122 comprises a brushless DC motor and motor 122 and transmission 126 are configured to maximize output torque while minimizing the mass of motor 122 and transmission 126. In this embodiment, motor 122 comprises a C10 2900 KV brushless outrunner motor; however, in other embodiments, the configuration of motor 122 may vary.

In this embodiment, both a pinion or output gear of motor 122 and transmission 126 are each positioned on the opposite side of upper body 104 from links 144, 148 (e.g., the output of motor 122 and transmission are positioned towards the front 101 whereas links 144, 148 are positioned towards the rear 103 of flapping-wing aircraft 100), where the output shaft of transmission 126 extends through a bearing assembly 154 of upper body 104 which acts to decouple shear loads from drive assembly 120 and transfer only torque to the bearing assembly of upper body 104. In this embodiment, motor 122 is driven by a 25 amp brushless speed controller and the power supply 340 of flapping-wing aircraft 100, which powers motor 122, comprises a 3-cell LiPo battery pack configured to supply motor 122 with about 11.1 volts (V); however, in other embodiments, the configuration of power supply 340 may vary.

Wings 180A, 180B of flapping-wing aircraft 100 are configured to be sufficiently strong to withstand the aerodynamic forces experienced by the wing 180A, 180B, and also are also as lightweight as possible to reduce inertial loads imposed at high flapping frequencies. Wings 180A, 180B comprise flexible wings capable of undergoing passive deformation was chosen since flexible wings are lighter than similarly sized rigid wings, and replicate biological wings much more closely. Additionally, studies have shown that flapping flexible wings at insect-scale Reynolds numbers generate greater amounts of lift when compared to their rigid counterparts. The motion of flexible wings 180A, 180B can be simplified kinematically down to two degrees of freedom: active flapping produced by drive assembly 120, and passive twisting (since the pitch angle is a function of spanwise location) permitted by the torsional compliance of the wing 180A, 180B and resulting from aerodynamic and inertial loading of wings 180A, 180B. In light of this, wings 180A, 180B were designed experimentally using aeroelastic tailoring by iteratively changing the wing structural components and their placement in order to vary the flexibility and thus the wing deformation during flapping such that the maximum amount of lift was generated.

Figure 7:
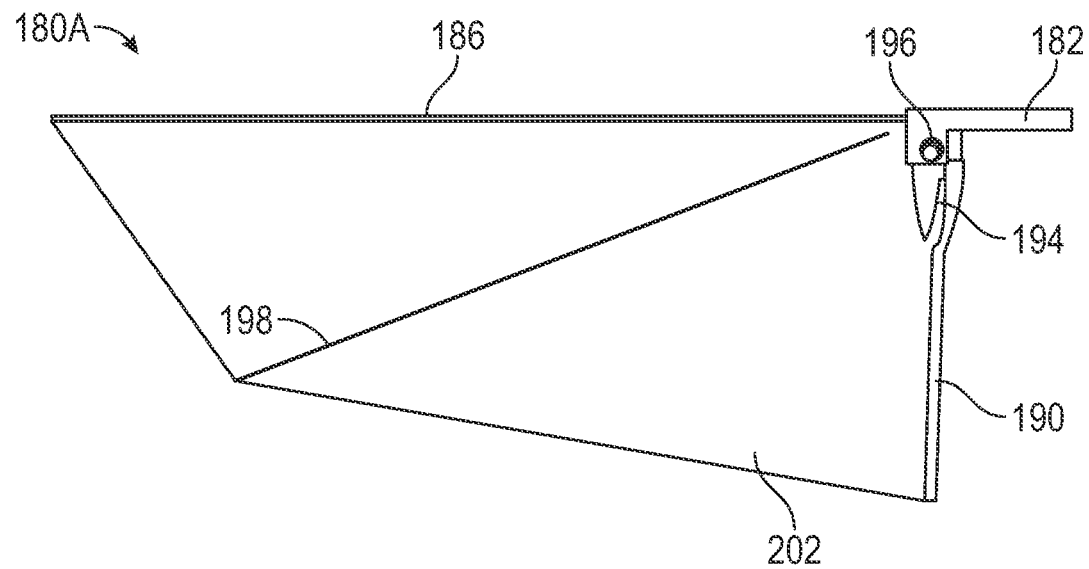
FIG. 7 is a front view of an embodiment of a flexible wing of the flapping-wing aircraft of FIG. 1 in accordance with principles disclosed herein.
Figure 8:
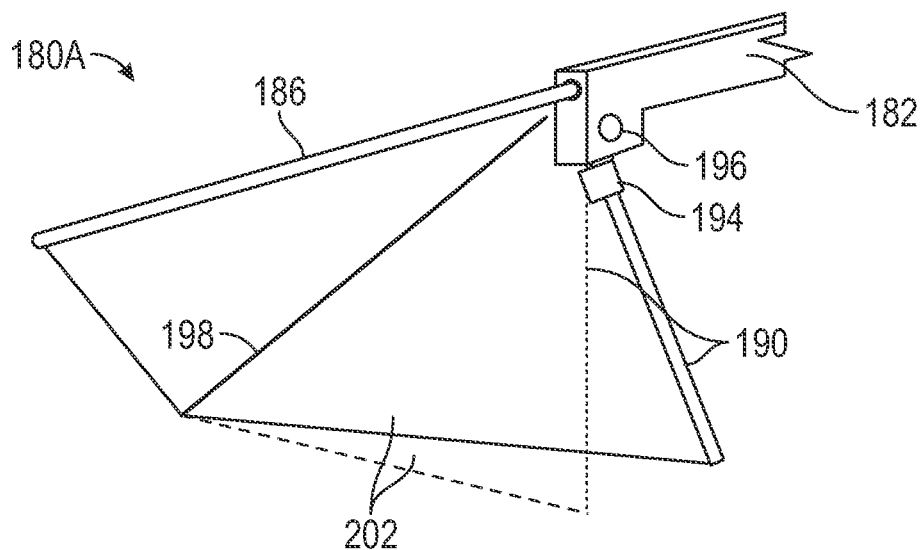
FIG. 8 is a perspective view of the flexible wing of FIG. 7.

As shown particularly in FIGS. 7, 8, each wing 180A, 180B (although wing 180A is shown in FIGS. 7, 8, wing 180B is configured similarly as wing 180A) comprises a wing root 182, a leading edge spar 186, a root spar 190, a flexible shim 194, a cross spar 198, and a skin 202. Wing roots 182 of wings 180A, 180B comprise the fifth links 148 of the linkage assembly 130 of drive assembly 120. The wing root 182 of each wing 180A, 180B comprises a wear resistant material, such as polyether ether ketone (PEEK) plastic and the like. Leading edge spar 186 comprises a stiff material to limit bending in and out of the flapping plane of wings 180A, 180B, both of which reduce lift.

The skin 202 of each wing 180A, 180B is stretched over the stiff spars 186 and 190 and comprises a flexible material configured to minimize the acoustic signature of the wing 180A, 180B during operation of flapping-wing aircraft 100. In this embodiment, skin 202 comprises foam membrane having a thickness of about 0.7-0.9 mm; however, in other embodiments, the configuration of skin 202 may vary. The cross spar 198 of each wing 180A, 180B is not directly attached to either leading edge spar 186 or root spar 190, and instead, is adhered to the skin 202. Cross spar 198 improves the lift generated by the wing 180A, 180B during stroke reversal by generating an inertial force that allows the wing 180A, 180B to take shape, thereby improving the lifting capability of the wing 180A, 180B.

Figure 9:
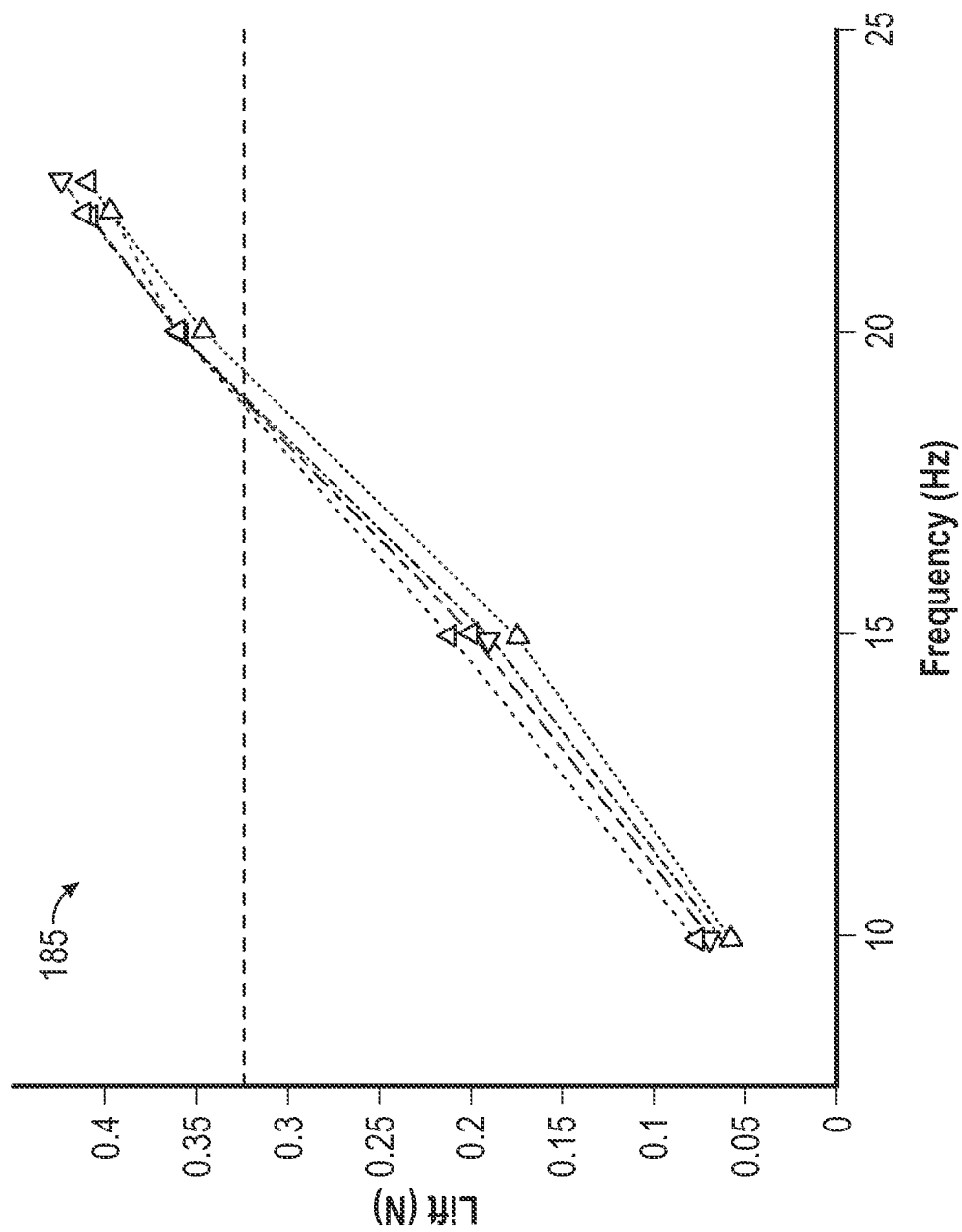
FIG. 9 is a graph illustrating lift versus flapping frequency of the flexible wing of FIG. 7.

The root spar 190 of each wing 180A, 180B is attached to the wing root 182 via the flexible shim 194, which is secured to wing root 182 via a screw 196. Flexible shim 194 offers functionality similar to that of a flexbeam in a rotor system. Particularly, the flexibility of shim 194 permits the root spar 190 of each wing 180A, 180B to bend or twist relative to the wing root 182, which permits the inboard portions of the wing 180A, 180B to have a steep angle of attack (e.g., about 70 deg) relative to the incoming airstream rather than being completely vertical to the incoming airstream. Thus, root spar 190 comprises a stiffer material than the material comprising shim 194. In this embodiment, the shim 194 of each wing 180A, 180B comprises prepreg carbon fiber, which is cantilevered to the wing root 182; however, in other embodiments, the configuration of shim 194 may vary. In this embodiment, each wing 180A, 180B has a total mass of about 0.8-0.9 grams and is configured to produce about 0.30-0.35 Newtons (N) (about half the mass of flapping-wing aircraft 100) at a flapping frequency of about 20 Hz, a frequency low enough to avoid excess vibration onboard flapping-wing aircraft 100. To demonstrate the repeatability of this process and to ensure similar performance characteristics between each manufactured wing 180A, 180B, a series of six identical wings 180A were constructed and tested. Graph 185 shown in FIG. 9 illustrates the thrust produced by the six identical wings 180A as a function of the flapping frequency of the wings 180A. The results presented in graph 185 show a substantial similarity at the target flapping frequency of 20 Hz, in which there is a maximum variation of about 0.02 N of lift, or about 5% variation in vertical force among the six wings 180A tested.

In order to characterize the wing performance and converge on optimal design dimensions for the flexible shim 194 of each wing 180A, 180B, systematic experiments were conducted, which varied the length of the shim 194 between the root spar 190 and wing root 182 of the wing 180A, and the thickness, in terms of layers of prepreg carbon fiber used in constructing the shim 194. Varying these parameters effectively changes the stiffness of the shim, and thus the amount of flexibility and permissible deformation. Two important quantities were used in this study to evaluate each wing's performance: lift/electrical power and lift/(frequency$^2$).

Lift/(electrical power) is of interest since the electrical power required to flap each wing 180A, 180B comes from the component of the resultant force that is parallel to the direction of motion of the wing 180A, 180B. It is generally desirable to minimize this component of the force by generating a resultant force that is as vertical as possible, thereby reducing the input power required to flap the wings 180A, 180B. The power required for flapping wings 180A, 180B manifests itself in the current drawn by motor 122 during operation; hence it is a function of electrical power. To understand the second quantity listed above (lift/(frequency$^2$)), it is important to note that as the flapping frequency of wings 180A, 180B is increased, the lift of a flexible wing (wings 180A, 180B) increases due to two reasons: (1) the fact that the wing is moving faster (higher dynamic pressure), and (2) as the forces increase with frequency, the passive wing twist increases and the wing starts morphing.

Even though the first effect monotonically increases lift with the flapping frequency of wings 180A, 180B, the second effect only increases lift until the wing 180A, 180B achieves the best shape (i.e., the shape that produces the highest lift coefficient), and then decreases as the frequency increases. Thus it may be beneficial to obtain an optimum frequency at which the wing 180A, 180B takes the best shape having the highest lift coefficient, and it may be beneficial to ensure that the optimum frequency is close to the operating frequency of wings 180A, 180B. Because the lift is a function of flapping frequency squared, it is necessary to divide by the quantity frequency$^2$ to remove the effect of speed and isolate the influence of wing shape on lift. For this study, the length of the flexible shim 194 was varied from about 1 mm to 2 mm, and the number of carbon fiber layers used in construction of the flexible shim 194 was varied between about two and three layers. In summary, a shim 194 having a length of about 1.5 mm constructed of two layers of carbon fiber performed most efficiently and was chosen as the final design embodied by the flapping-wing aircraft 100.

A two-winged flapping aircraft is in general an inherently unstable system; therefore, its attitude stabilization scheme is important for permitting controlled hover flight of the aircraft. Conventional hovering flapping-wing MAVs use external control surfaces, unlike hover capable biological systems such as hummingbirds, which are able to achieve stability without such devices. Unlike conventional flapping-wing MAVs, the flapping-wing aircraft disclosed herein provide true biomimicry with a plurality of actuation assemblies 220, 250, and 280 which provide an approach having great simplicity in view of conventional flapping-wing MAVs. In this embodiment, actuation assemblies 220, 250, and 280 provide control and stability for flapping-wing aircraft 100 by varying the specific kinematics of wings 180A, 180B during flapping. In this embodiment, actuation assemblies 220, 250, and 280 have a combined mass of about 16.6-17.0 grams; however, in other embodiments, the combined mass of actuation assemblies 220, 250, and 280 may vary.

The principles of wing kinematic modulation disclosed herein involve altering the wing flapping motion through tilting the flapping plane of wings 180A, 180B, increasing or decreasing the stroke amplitude of wings 180A, 180B, and/or shifting the mean position of the stroke of wings 180A, 180B forwards in the direction of the front 101 of flapping-wing aircraft 100 or backwards in the direction of the rear 104 of flapping-wing aircraft 100. The effect of these modulations of wings 180A, 180B is to change the magnitude and direction of the lift vectors produced by wings 180A, 180B as well as the relative longitudinal position of the aerodynamic centers (ACs) of wings 180A, 180B and CG 111 of flapping-wing aircraft 100 to control and stabilize flapping-wing aircraft 100 in pitch, roll and yaw.

Figure 10A:
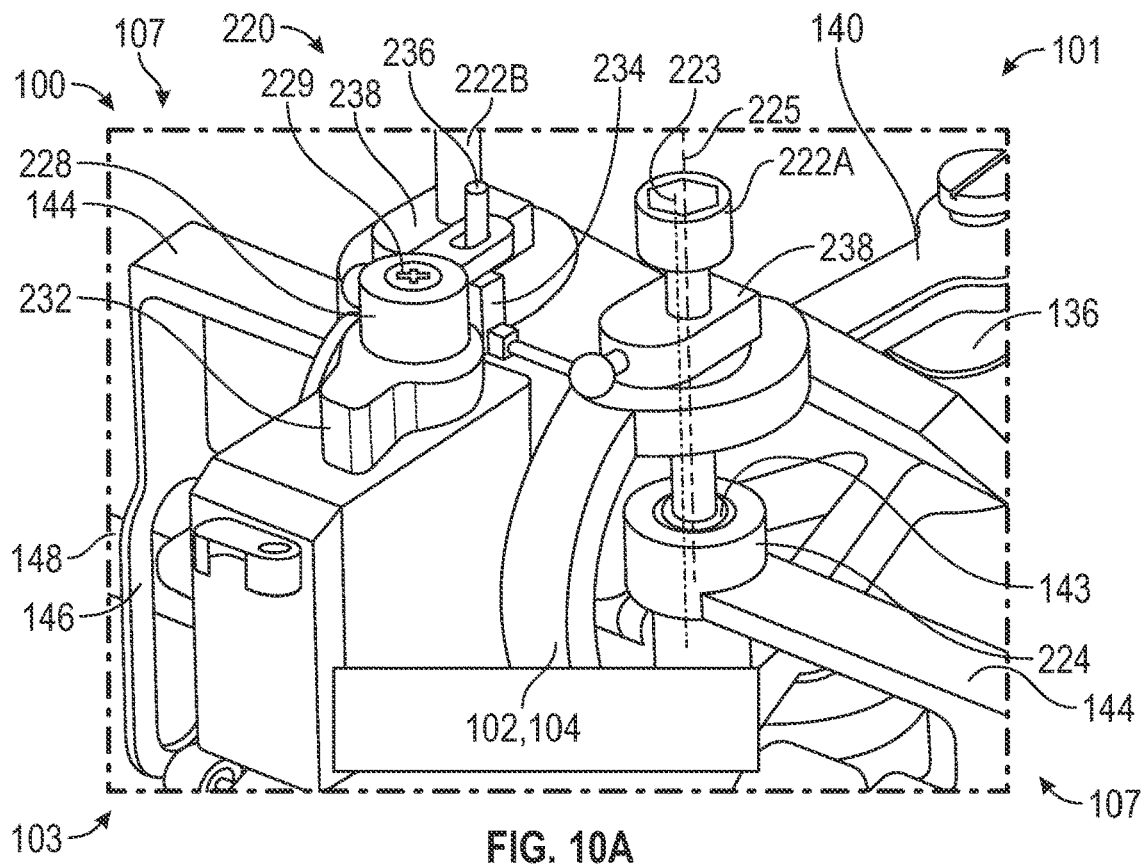
FIG. 10A is a perspective view of an embodiment of a pitch actuation assembly of the flapping-wing aircraft of FIG. 1 in a first position in accordance with principles disclosed herein.
Figure 10B:
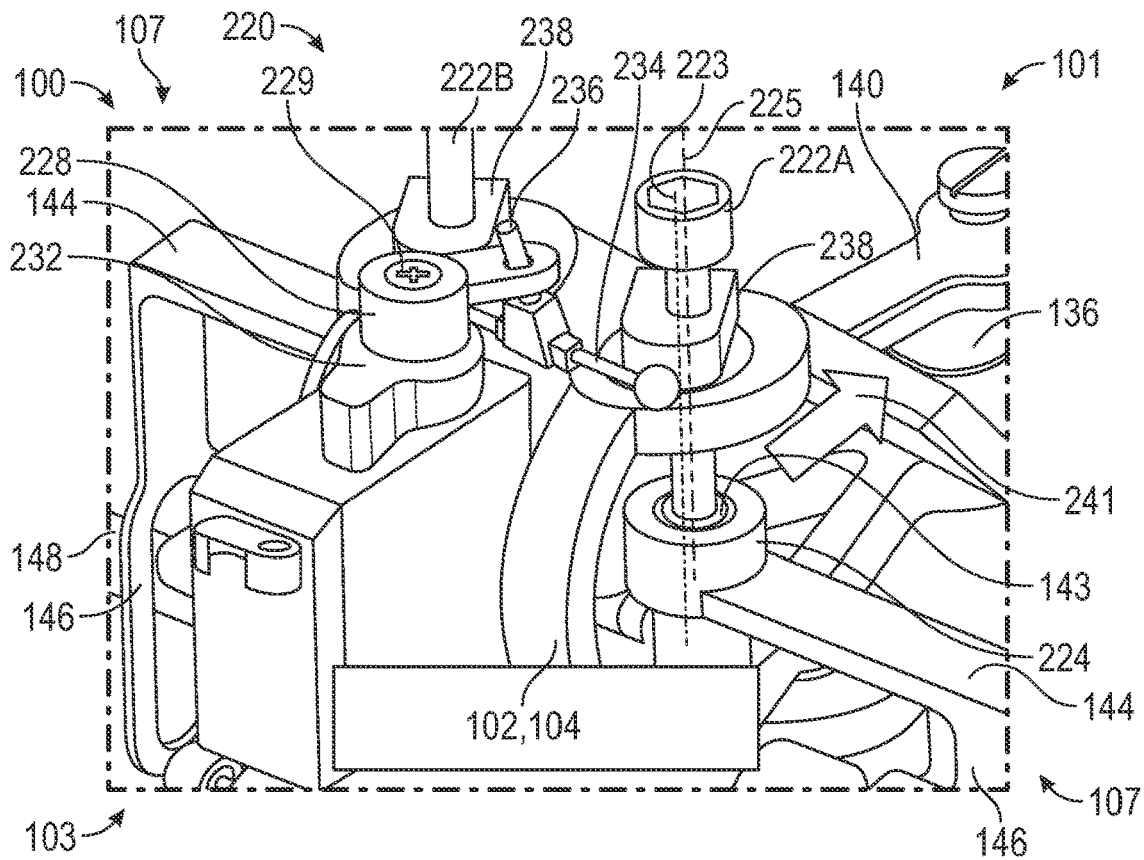
FIG. 10B is a perspective view of the pitch actuation assembly of FIG. 10A in a second position.
Figure 10C:
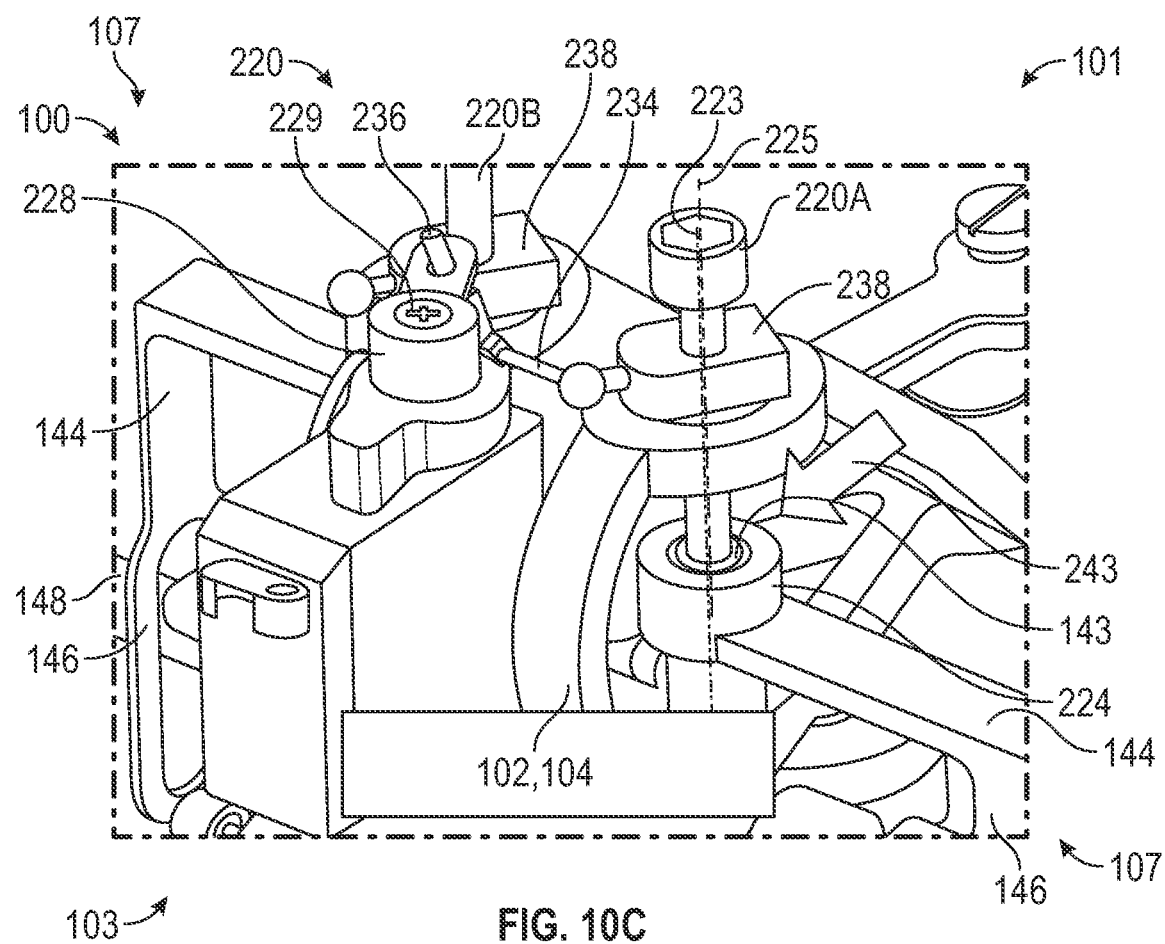
FIG. 10C is a perspective view of the pitch actuation assembly of FIG. 10A in a third position.

Referring to FIGS. 1-11, the pitch actuation assembly 220 of flapping-wing aircraft 100 is shown in detail in FIGS. 10A-10C. Pitch actuation assembly 220 is generally configured to adjust a pitch moment or torque applied to flapping-wing aircraft 100 about lateral axis 109. Pitch actuation assembly 220 generally includes a pair of pivot shafts 222A, 222B, a swing arm 228, a pitch servo 232, and a pitching yolk 234. Each pivot shaft 222A, 222B generally extends along a longitudinal or rotational axis 223, and each pivot shaft 222A, 222B is pivotable relative to upper body 104 about rotational axis 223. Additionally, each pivot shaft 222A, 222B includes an offset shaft or crank throw 224 having a longitudinal or flapping axis 225 that is offset from the rotational axis 223 of the pivot shaft 222A, 222B. Third pivot joints 143 are received in crank throws 224 of pivot shafts 222A, 222B. Thus, although pivot shafts 222A, 222B are pivotable relative to upper body 104 about rotational axes 223, the fourth links 144 of linkage assembly 130 are pivotable about the offset flapping axes 225 of pivot shafts 222A, 222B.

Pitch servo 232 of pitch actuation assembly 220 is configured to selectably rotate swing arm 228 about a pivot joint 229 in response to the communication of a control signal transmitted to pitch servo 232 from autopilot 312. In the embodiment of FIGS. 1-11, pitch servo 232 comprises a Power HD® DSP-33 digital micro-servo having short actuation time of about 0.09 s/60 deg of rotation, high torque output, and minimal weight penalty; however, in other embodiments, the configuration of pitch servo 232 may vary.

Swing arm 228 is coupled to pitching yolk 234 via a pin 236 of pitching yolk 234. Additionally, pitching yolk 234 couples to pivot shafts 22A, 22B via a pair of ball joint connectors 238. In this configuration, pitching yolk 234 is configured to rotate pivot shafts 22A, 22B about their respective rotational axes 223 in response to rotation of swing arm 228 about pivot joint 229 (swing arm 228 being actuated by pitch servo 232). Additionally, given the offset between the flapping axis 225 and the rotational axis 223 of each pivot shaft 222A, 222B, the flapping axis 225 of each pivot shaft 222A, 222B may be displaced forwards towards the front 101 of flapping-wing aircraft 100 and backwards towards the rear 103 of aircraft 100 relative to the rotational axis 223 of each pivot shaft 222A, 222B in response to the actuation of swing arm 228.

Particularly, swing arm 228 includes: a first or neutral position (shown in FIG. 10A) where the flapping axis 225 of each pivot shaft 222A, 222B is positioned along lateral axis 109 of flapping-wing aircraft 100; a second or forwards position (shown in FIG. 11B) where swing arm 228 is pivoted in the direction of first pivot shaft 222A and the flapping axis 225 of each pivot shaft 222A, 222B is displaced forwards (indicated by arrow 241 in FIG. 10B) towards the front 101 of flapping-wing aircraft 100 such that flapping axes 225 are each positioned between the lateral axis 109 and the front 101 of aircraft 100; and a third or rearwards position (shown in FIG. 10C) where swing arm 228 is pivoted in the direction of second pivot shaft 222B and the flapping axis 225 of each pivot shaft 222A, 222B is displaced rearwards (indicated by arrow 243 in FIG. 10C) towards the rear 103 of flapping-wing aircraft 100 such that flapping axes 225 are each positioned between the lateral axis 109 and the rear 103 of aircraft 100. Given that the third pivot joints 143 that define the pivot joints fourth links 144 are disposed coaxial with flapping axes 225, third pivot joints 143 are shifted forwards and backwards in concert with flapping axes in response to the actuation of swing arm 228 between the neutral, forwards, and rearwards positions. In this embodiment, offset shafts 224 and flapping axes 225 are rotated about ±30 deg, in response to the actuation of swing arm 228 between the frontwards and rearwards positions; however, in other embodiments the angular displacement of offset shafts 224 and flapping axes 225 may vary.

To generate a pure pitching moment, an AC 187 (shown in FIG. 11) of wings 180A, 180B are shifted either forward (towards front 101 of flapping-wing aircraft 100) or backward (towards rear 103 of flapping-wing aircraft 100) relative to the CG 111 of flapping-wing aircraft 100 by varying the mean position of the stroke of each wing 180A, 180B. The length of first link 132 of linkage assembly 130 is lengthened by shifting pivot points 143 forwards towards the front 101 of flapping-wing aircraft 100 (reducing the length of first link 132) and rearwards towards the rear 103 of aircraft (lengthening first link 143) via the actuation of swing arm 228. Due to the slidable coupling between fourth links 144 and fifth links 148, by shifting pivot points 143 forwards towards front 101 in response to actuating swing arm 228 into the frontwards position, the ACs 187 of wings 180A, 180B are shifted rearwards towards rear 103, producing rearwards longitudinal offsets 189 (shown in FIG. 11) between the ACs 187 of wings 180A, 180B and the lateral axis 109 extending through CG 111 of flapping-wing aircraft 100.

Figure 11:
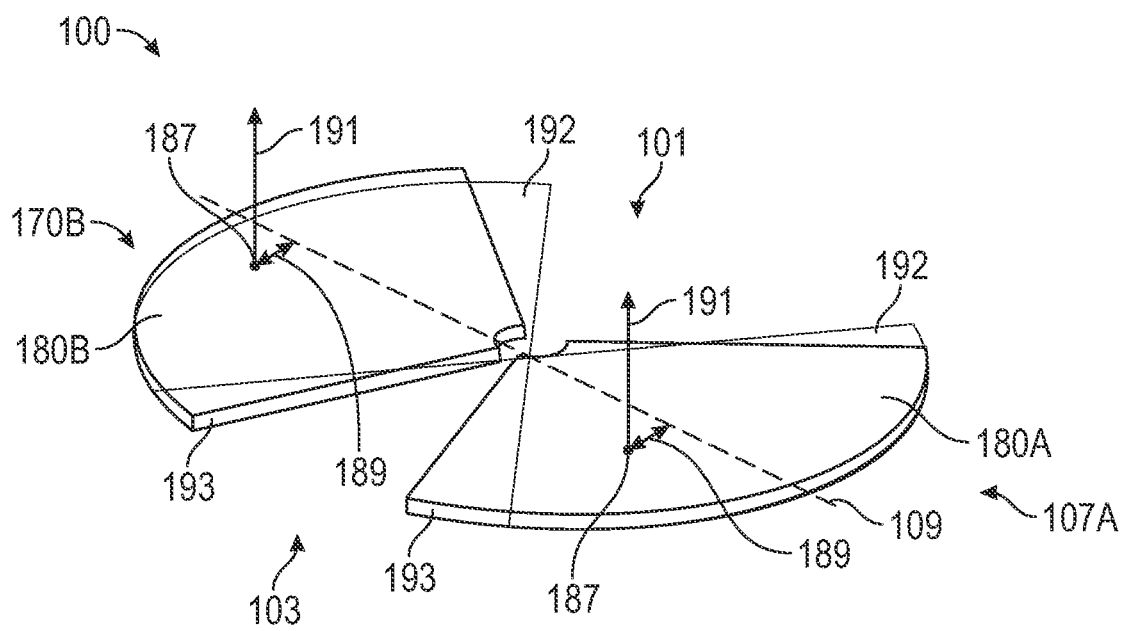
FIG. 11 is a schematic view of a pair of wings of the flapping-wing aircraft of FIG. 1.

The introduction of longitudinal offsets 189 between the ACs 187 of wings 180A, 180B and CG 111 results in the lift vectors 191 (shown in FIG. 11) produced by the flapping of wings 180A, 180B no longer passing through CG 111, thereby creating a forwards pitching moment about CG 111 (a clockwise pitching moment about lateral axis 109 in FIG. 11) of flapping-wing aircraft 100. The rearwards shift of the ACs 187 of wings 180A, 180B is indicated in FIG. 11 by the shift from an initial wing sweep 192 of wings 180A, 180B when swing arm 228 is in the neutral position, to a rearward wing sweep 193 of wings 180A, 180B when swing arm 228 is in the forwards position. A rearwards pitching moment (a counterclockwise pitching moment about lateral axis 109 in FIG. 11) may be produced by actuating swing arm 228 into the rearwards position, thereby producing frontwards longitudinal offsets (not shown) between the ACs 187 of wings 180A, 180B and the lateral axis 109 extending through CG 111 of flapping-wing aircraft 100. The inclusion of the pitch wing modulation technique provided by pitch actuation assembly 220 permits the trimming of flapping-wing aircraft 100 required for hovering flight and the ability to adjust the pitch angle of aircraft 100 without introducing forward translation of aircraft 100.

Figures 12A, 12B:
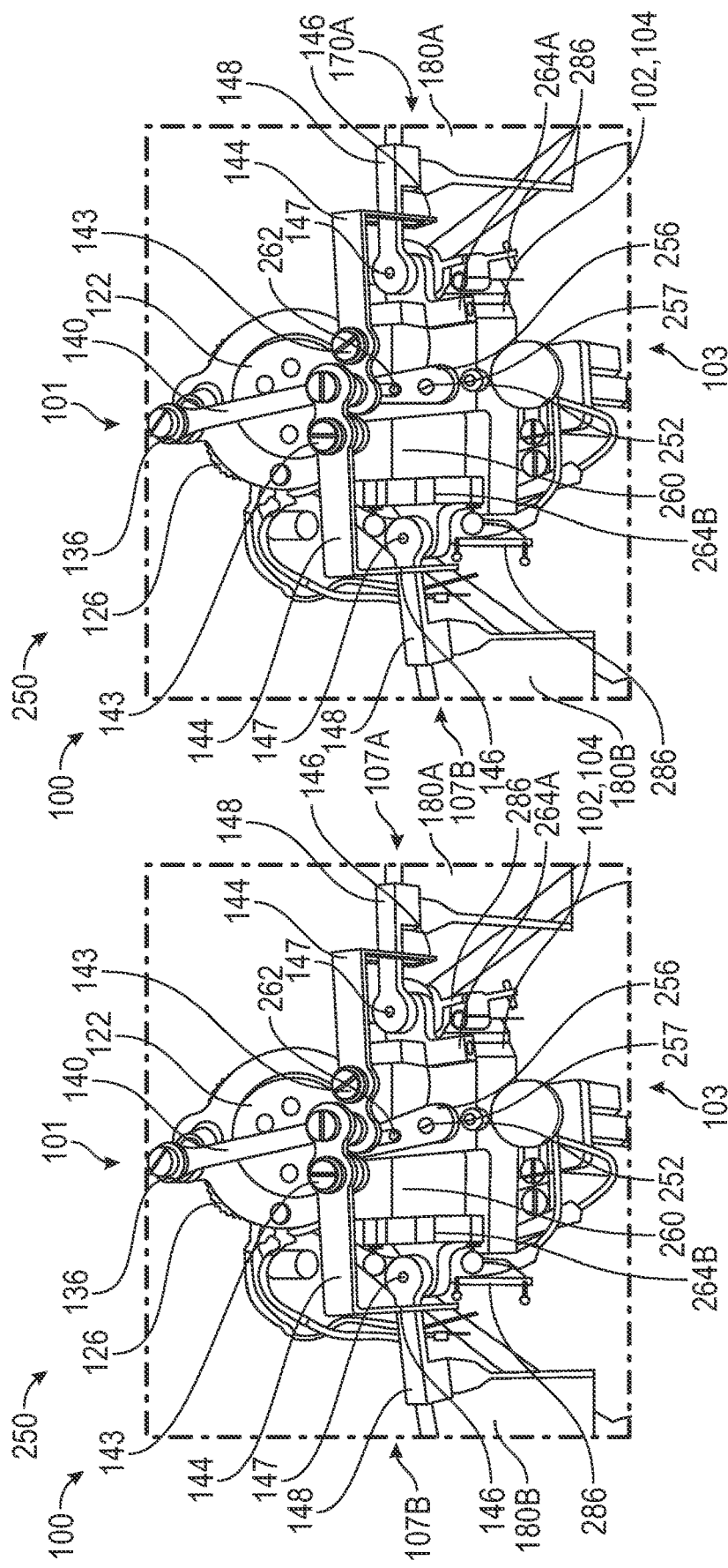
FIG. 12A is a perspective view of an embodiment of a roll actuation assembly of the flapping-wing aircraft of FIG. 1 in a first position in accordance with principles disclosed herein.
FIG. 12B is a perspective view of the roll actuation assembly of FIG. 12A in a second position.
Figure 12C:
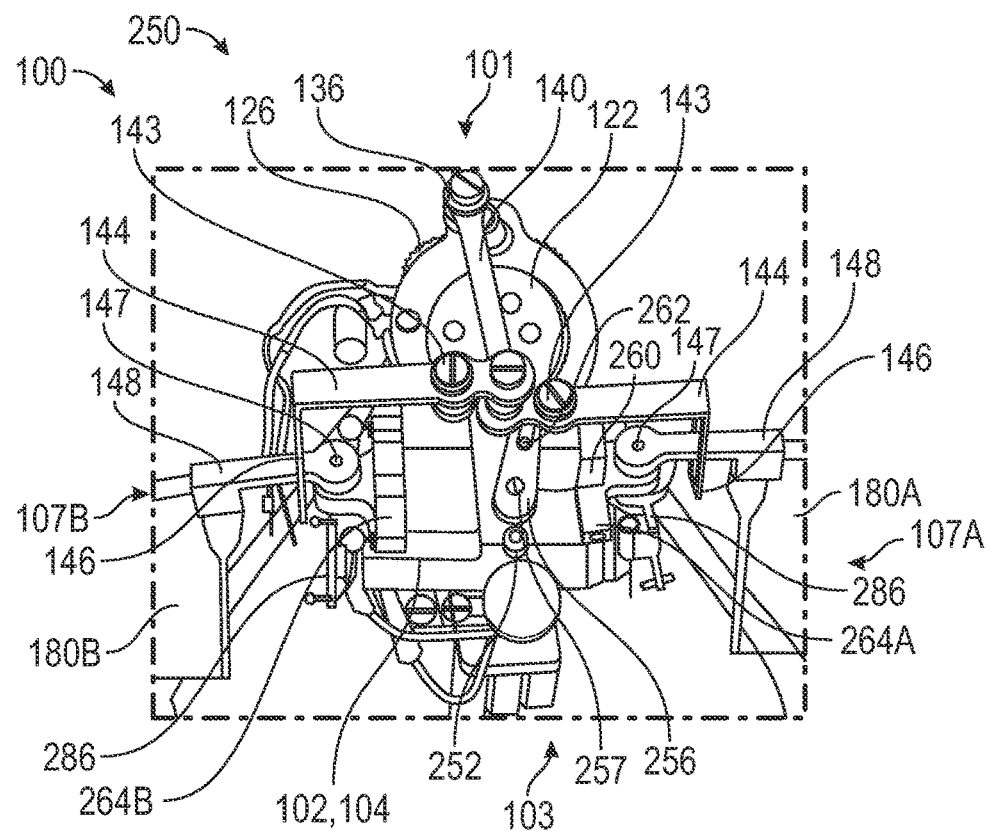
FIG. 12C is a perspective view of the roll actuation assembly of FIG. 12A in a third position.
Figure 13:
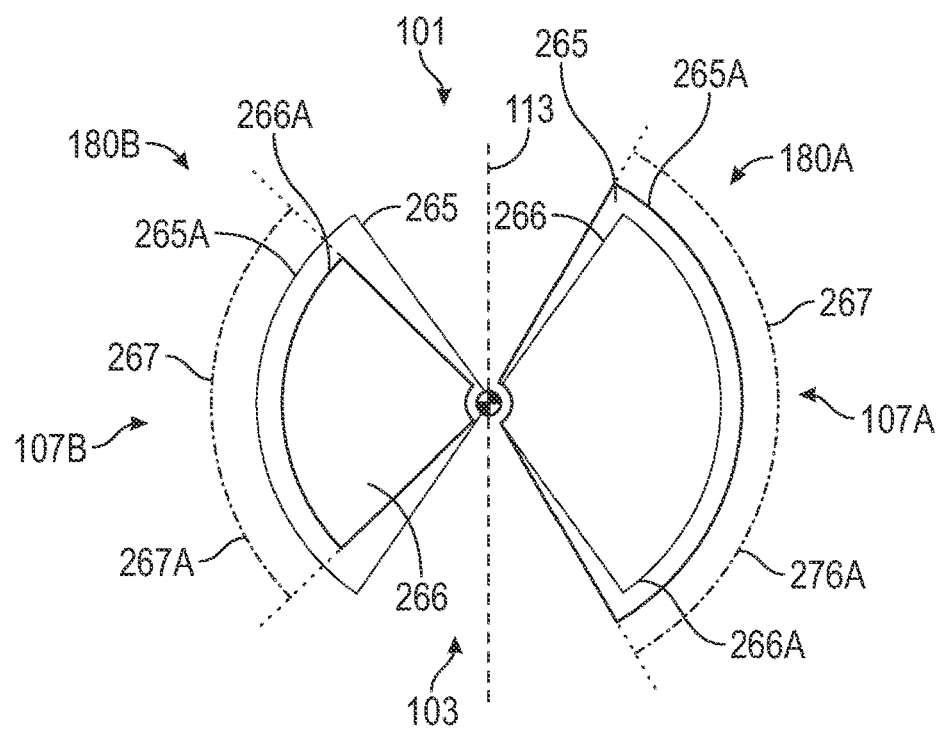
FIG. 13 is another schematic view of the pair of wings of the flapping-wing aircraft of FIG. 1.

Referring to FIGS. 1-14, the roll actuation assembly 250 of flapping-wing aircraft 100 is shown in detail in FIGS. 12A-12C. Roll actuation assembly 250 generally includes a roll servo 252, a swing arm 256, a roll bar 260, and a pair of wing mounts 264A, 264B. Roll servo 252 of roll actuation assembly 250 is configured to selectably rotate swing arm 256 relative upper body 104 of support frame 102 about a pivot joint 257 in response to the communication of a control signal transmitted to roll servo 252 from autopilot 312. In the embodiment of FIGS. 1-14, roll servo 252 comprises a Power HD® DSP-33 digital micro-servo having short actuation time of about 0.09 s/60 deg of rotation, high torque output, and minimal weight penalty; however, in other embodiments, the configuration of roll servo 252 may vary. Roll bar 262 is coupled to swing arm 256 via a linkage that includes a pin 262 which converts the rotational motion of swing arm 256 about pivot joint 257 into linear motion along a longitudinal axis of roll bar 262, the longitudinal axis of roller bar 262 extending parallel with the lateral axis 109 of flapping-wing aircraft 100.

Particularly, swing arm 256 includes a first or neutral position (shown in FIG. 12B), a second or first shifted position (shown in FIG. 12C) where roll bar 260 is shifted linearly in the direction of first side 107A, and a third or second shifted position (shown in FIG. 12A) where roll bar 260 is shifted linearly in the direction of second side 107B. Wing mounts 264A, 264B are attached to the longitudinal ends of roll bar 260, and thus travel in concert with roll bar 260 between sides 107A, 107B of flapping-wing aircraft 100 as swing arm 256 is actuated between the neutral, first shifted, and second shifted positions. Additionally, the fourth pivot joints 147 about which the fifth links 148 of linkage assembly 130 are coupled to wing mounts 264A, 264B, and thus fifth links 148 and the wings 180A, 180B coupled thereto also shift between sides 107A, 107B of flapping-wing aircraft 100 in response to the actuation of swing arm 256 between the neutral, first shifted, and second shifted positions. Shifting the lateral position (the position relative sides 107A, 107B) of fourth pivot joints 147 acts to change the length of the roll trim 268 (shown in FIG. 4) extending between each third pivot joint 143 and each fourth pivot joint 147.

Particularly, when swing arm 256 is actuated into the first shifted position shown in FIG. 12C, the roll trim 268 extending between the third pivot joint 143 and the fourth pivot joint 147 of the fifth link 148 coupled with first wing 180A is increased in length while the roll trim 268 extending between the third pivot joint 143 and the fourth pivot joint 147 of the fifth link 148 coupled with second wing 180B is decreased in length by an equal amount. Additionally, when swing arm 256 is actuated into the second shifted position shown in FIG. 12A, the roll trim 268 extending between the third pivot joint 143 and the fourth pivot joint 147 of the fifth link 148 coupled with first wing 180A is decreased in length while the roll trim 268 extending between the third pivot joint 143 and the fourth pivot joint 147 of the fifth link 148 coupled with second wing 180B is increased in length by an equal amount.

The roll actuation assembly 250 of flapping-wing aircraft 100 is configured to adjust a roll moment or torque applied to flapping-wing aircraft 100 about a longitudinal or roll axis 113 of aircraft 100 extending through CG 111 and disposed orthogonal lateral axis 109 via differential flap amplitude modulation, which changes the sweep area of each wing 180A, 180B and thus the total lift generated by each wing 180A, 180B. Particularly, each wing 180A, 180B includes an initial sweep area 265 (shown in FIG. 13) defined by an arcuate initial flap angle 265A, a reduced sweep area 266 defined by an arcuate reduced flap angle 266A which produces less thrust at a given flapping frequency than the initial sweep area 265, and an enlarged sweep area 267 defined by an arcuate enlarged flap angle 267A which produces greater thrust at a given flapping frequency than either the reduced sweep area 266 or the initial sweep area 265. As shown in a graph 263 of FIG. 14, which illustrates flap angles 265A, 266A, and 267A as a function of the angular position of the drive gear of motor 122, in this embodiment, the neutral flap angle 265A is about ±60 deg, the reduced flap angle 266A is about ±50 deg, and the enlarged flap angle 267A is about ±75 deg; however, in other embodiments, the amplitudes of flap angles 265A, 266A, and 267A may vary.

By actuating swing arm 256 of roll actuation assembly 250 into the first shifted position, thereby increasing the length of the roll trim 268 of first wing 180A and decreasing, by an equal amount, the roll trim 268 of second wing 180B, the sweep area of first wing 180A is increased to the enlarged sweep area 267 while the sweep area of the second wing 180B is decreased to the reduced sweep area 266, which, due to the greater thrust produced by first wing 180A relative second wing 180B, produces a roll moment about CG 111 (about longitudinal axis 113 in FIG. 13) of flapping-wing aircraft 100 towards the second side 107B. By actuating swing arm 256 of roll actuation assembly 250 into the second shifted position, thereby decreasing the length of the roll trim 268 of first wing 180A and increasing, by an equal amount, the roll trim 268 of second wing 180B, the sweep area of first wing 180A is decreased to the reduced sweep area 266 while the sweep area of the second wing 180B is increased to the enlarged sweep area 267, which, due to the greater thrust produced by second wing 180B relative first wing 180A, produces a roll moment about CG 111 (about longitudinal axis 113 in FIG. 13) of flapping-wing aircraft 100 towards the first side 107A. When swing arm 256 is in the neutral position, each wing 180A, 180B comprises the neutral sweep area 265, and thus no roll moment about CG 111 of flapping-wing aircraft 100 is created.

Figure 15A:
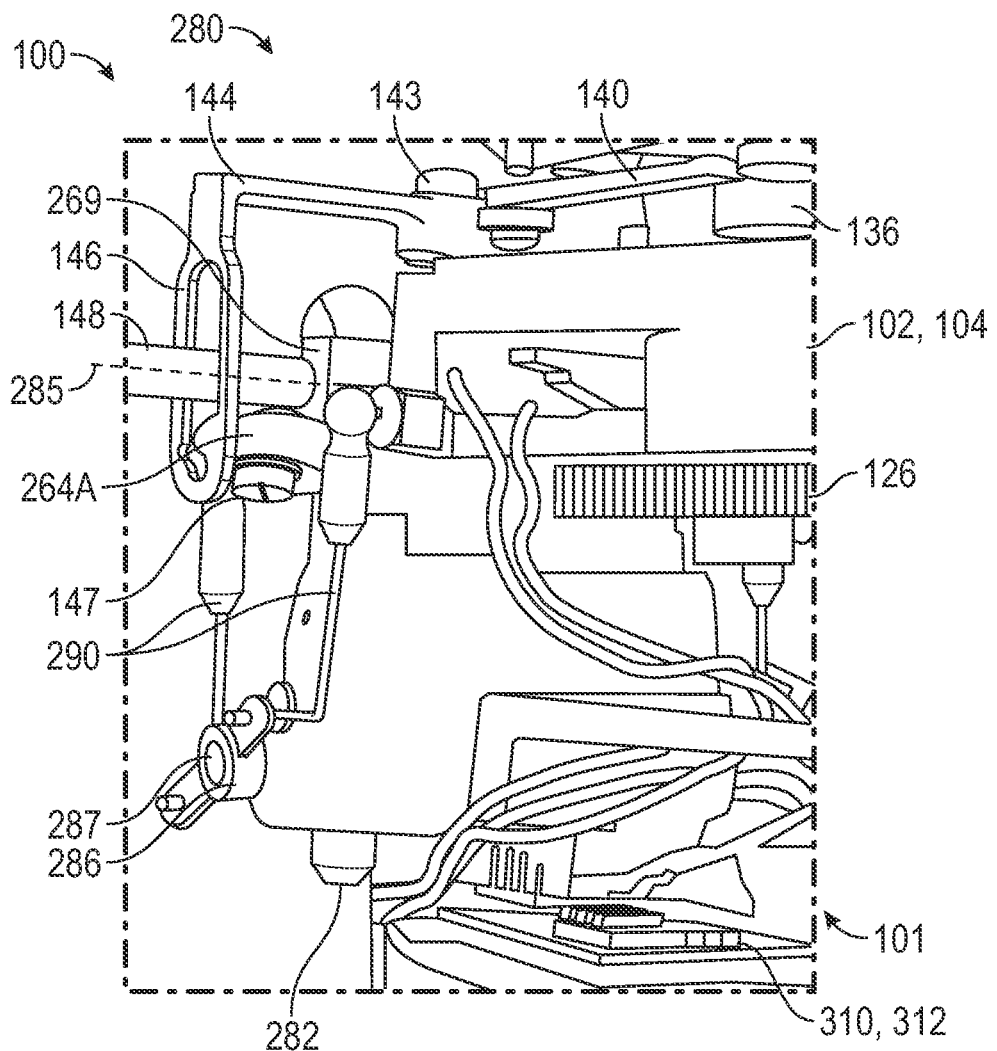
FIG. 15A is a perspective view of an embodiment of a yaw actuation assembly of the flapping-wing aircraft of FIG. 1 in a first position in accordance with principles disclosed herein.

Referring to FIGS. 1-17, the yaw actuation assembly 280 of flapping-wing aircraft 100 is shown in detail in FIGS. 15A-15C. Yaw actuation assembly 280 generally includes a pair of yaw servos 282, a pair of swing arms 286, and two pairs of pitch links 290. Yaw actuation assembly 280 is generally configured to adjust a yaw moment or torque applied to flapping-wing aircraft 100 about the vertical axis 105 of flapping-wing aircraft 100. Each Yaw servo 282 of yaw actuation assembly 280 is configured to selectably rotate a swing arm 286 relative to upper body 104 of support frame 102 about a pivot joint 287 in response to the communication of a control signal transmitted to yaw servo 282 from autopilot 312. In the embodiment of FIGS. 1-17, each yaw servo 282 comprises a Power HD® DSP-33 digital micro-servo having short actuation time of about 0.09 s/60 deg of rotation, high torque output, and minimal weight penalty; however, in other embodiments, the configuration of yaw servo 282 may vary. Pitch links 290 extend between and couple swing arms 287 with wing mounts 264A, 264B.

Particularly, each swing arm 287 is configured to rotate a corresponding wing mount 264A, 264B about a common pitch axis 285 which extends parallel with the lateral axis 109. Each wing mount 264A, 264B is pivotably coupled to the upper body 104 of support frame 102 via a pair of pivotable joints 269, where pitch axis 285 extends through pivotable joints 269. Thus, the swing arm 287 coupled with first wing mount 264A may selectably rotate first wing mount 264A and the first wing 180A coupled therewith about pitch axis 285 while the swing arm 287 coupled with second wing mount 264B may selectably rotate second wing mount 264B and the second wing 180B coupled therewith about pitch axis 285.

The principle of yaw moment generation of flapping-wing aircraft 100 about vertical axis 105 is achieved by tilting a flapping plane 292A, 292B (shown in FIG. 16) of each wing 180A, 180B about pitch axis 285. Particularly, when flapping planes 292A, 292B are each disposed in a neutral position such that each plane 292A, 292B lies within a laterally extending plane intersecting pitch axis 285, no yawing moment about the vertical axis 105 of flapping-wing aircraft 100 is created. When first flapping plane 295A is tilted about pitch axis 285 in a first rotational direction towards the rear 103 of flapping-wing machine 100 (creating an inclined first flapping plane 295A'), a negative first flapping angle 297A is created between the neutral first flapping plane 295A and the inclined first flapping plane 295A'. Additionally, when second flapping plane 295B is tilted about pitch axis 285 in a second rotational direction, opposite the first rotational direction, towards the front 101 of flapping-wing machine 100 (creating an inclined second flapping plane 295B'), a positive second flapping angle 297B is created between the neutral second flapping plane 295B and the inclined second flapping plane 295B'.

Figure 16:
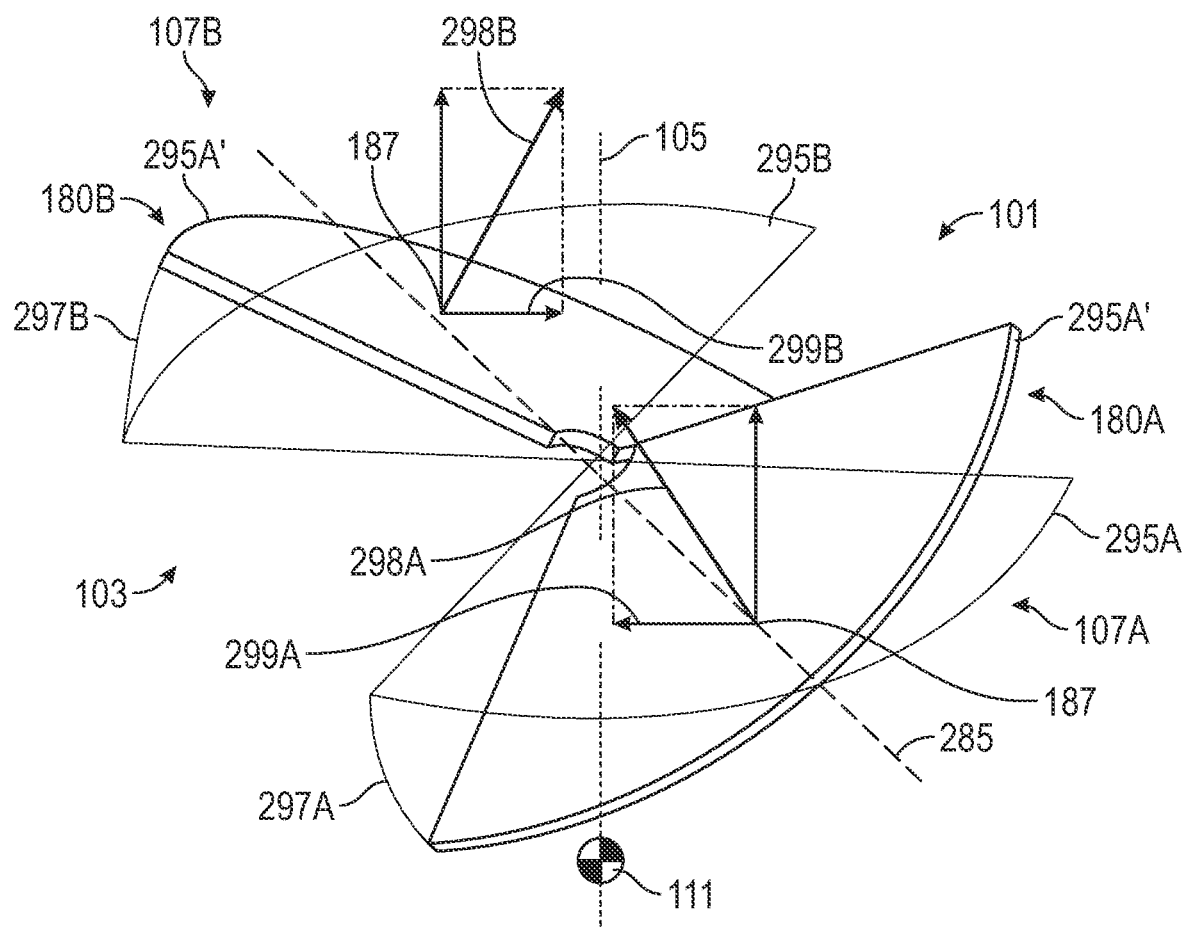
FIGS. 16 and 17 are additional schematic views of the pair of wings of the flapping-wing aircraft of FIG. 1.
Figure 17:
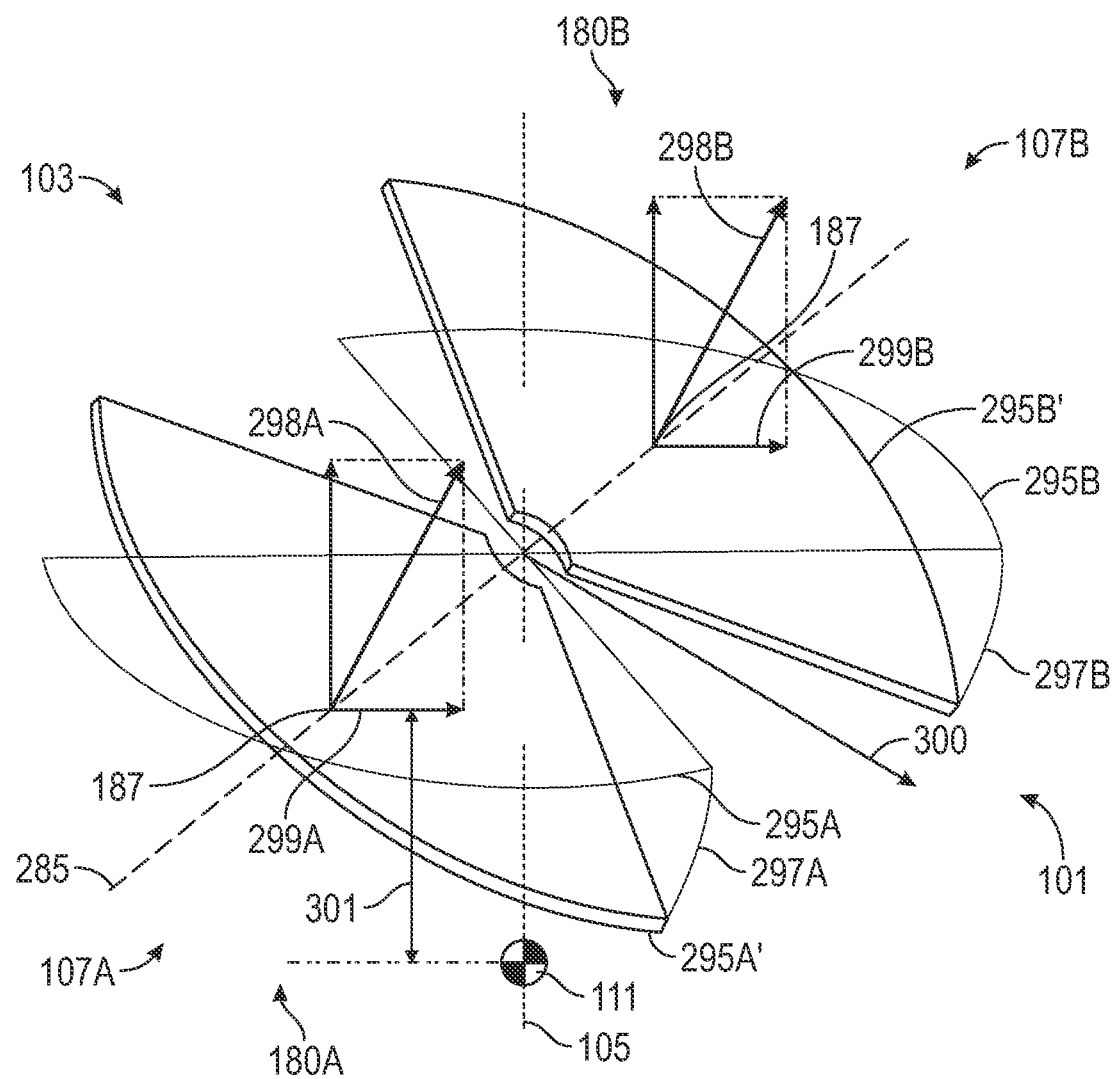

Given that inclined first flapping plane 295A' is inclined towards the rear 103 of flapping-wing aircraft 100 while the inclined second flapping plane 295B' is inclined towards the front 101, horizontal components 299A, 299B of the lift vectors 298A, 298B generated by flapping wings 180A, 180B, respectively, extend in opposite directions, thereby creating a yaw moment about vertical axis 105 of flapping-wing aircraft 100 in a first rotational direction (clockwise in FIG. 16). Further, by tilting first flapping plane 295A in the opposite direction towards front 101 of flapping-wing aircraft 100, and tilting second flapping plane 295B in an opposite direction towards rear 103, a yaw moment about vertical axis 105 of flapping-wing aircraft 100 in a second rotational direction (counterclockwise in FIG. 16), opposite the first rotational direction, may be created. Thus, by actuating swing arms 286, the angular orientation of the lift vectors 298A, 298B generated by flapping wings 180A, 180B may be adjusted as desired.

Beyond the capability for creating a yaw moment about the vertical axis 105, yaw actuation assembly 280 is also configured to linearly translate flapping-wing aircraft 100 forwards and backwards in hovering flight. Particularly, a coupled pitching moment and translational force 300 (shown in FIG. 17) is achieved by synchronously tilting the flapping planes 295A, 295B of both wings 180A, 180B in either a forwards or rearwards direction (flapping planes 295A, 295B are shown tilted in the forwards direction in FIG. 17) such the horizontal components 299A, 299B of lift vectors 298A, 298B extend in the same direction. Given that lift vectors 298A, 298B, each originating from the ACs 187 of wings 180A, 180B, respectively, now no longer passes through CG 111 of flapping-wing aircraft 100, a moment is generated about CG 111 from horizontal components 299A, 299B, which act at a vertical distance 301 above the CG 111 of flapping-wing aircraft 100.

Figure 18:
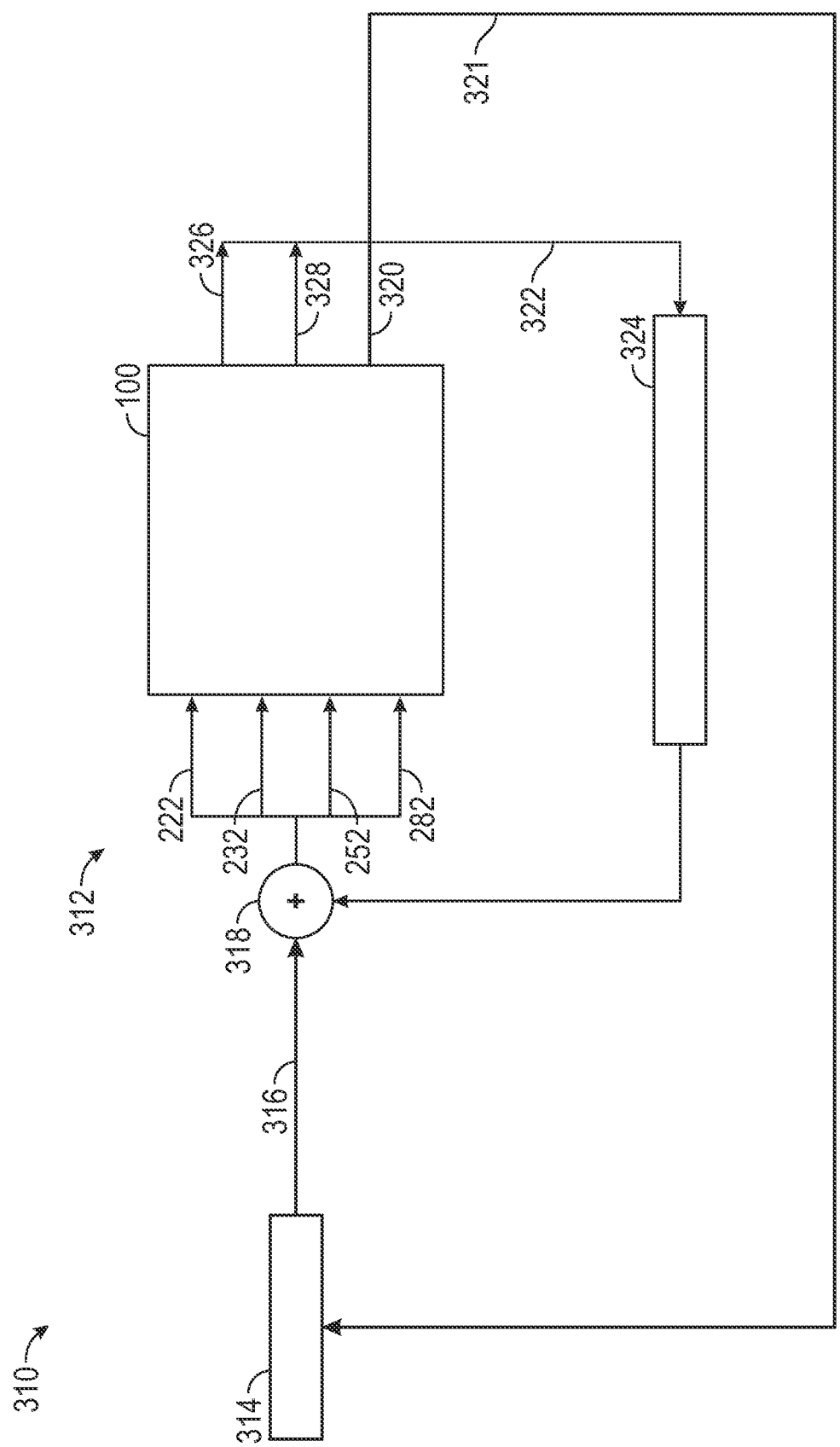
FIG. 18 is a schematic view of an embodiment of a control system of the flapping-wing aircraft of FIG. 1.

Referring to FIGS. 1-9, and 19, the control system 310 of flapping-wing aircraft 100 is shown schematically in FIG. 18. Attitude stabilization of flapping-wing aircraft 100 is implemented onboard using autopilot 312 which comprises a custom-built embedded processor-sensor board. In the embodiment of FIGS. 1-9 and 18, autopilot 312 has a mass of about 1.2-1.4 grams and is powered by a single 1-cell 3.7 volt 30 mAh Li—Po battery. Additionally, in this embodiment, autopilot 312 includes a STM32 microprocessor with a 32-bit ARM Cortex M3 core for high-end onboard computation tasks; however, in other embodiments, the configuration of autopilot 312 may vary. Further, in this embodiment, autopilot 312 includes a MPU-9150 IMU motion processing unit integrated on the board thereof which includes tri-axial gyroscopes, accelerometers, and magnetometers. Wireless communications are serviced in this embodiment by an on-board nRF24L01 chip, and a low-power 2.4 GHz RF transceiver. In this embodiment, autopilot 312 has a sensor update rate of 500 Hz and is capable of streaming vehicle attitude and actuator controls data to the base station with a short latency. Autopilot 312 senses the attitude of flapping-wing aircraft 100 and sends corrective signals to servos 232, 252, and 282 of actuation assemblies 220, 250, and 280, respectively, for stabilization by varying the pulse width input to servos 232, 252, and 282.

As shown particularly in FIG. 18, in this embodiment, to communicate with the onboard autopilot 312, an operator of flapping-wing aircraft 100 positioned distal aircraft 100 at a base station 314 may use a LabVIEW interface through a wireless IEEE 802.15.4 data link to connect the on-board microcontroller of autopilot 312 to a LabVIEW program of base station 314 wirelessly via a 2.4 GHz radio link. A separate wired connection between the base station 314 and a commercially available DX6i Spectrum transmitter allows the operator of flapping-wing aircraft 100 to provide roll, pitch, yaw, and flapping frequency control inputs 316 to actuation assemblies 220, 250, 280, and motor 222. The LabVIEW program of base station 314 also allows the operator to modify feedback gains 318, change the sensitivity of pilot control inputs 316, and record attitude data 320 transmitted by the onboard processor of autopilot 312. In this embodiment, all the data processing and feedback control calculations are performed onboard by the microprocessor of autopilot 312.

The on-board gyros of autopilot 312 measure the pitch, roll and yaw angular rates while the accelerometers record the tilt of the gravity vector in upper body 104 of support frame 102. The attitude of flapping-wing aircraft 100 can be extracted by integrating the gyro measurements with time. However, it is known that this may lead to drift in attitude measurements. Accelerometers on the other hand offer stable bias, but are may be sensitive to vibrations and in general offer poor high frequency information. Therefore, a complementary filter is incorporated in autopilot 312 to extract the pitch and roll Euler angles using a high-pass filter for the gyros (about a 4 Hz cut-off) and a low-pass filter for accelerometers (about a 6 Hz cut-off). The flapping vibrations from wings 180A, 180B are filtered out since they are sufficiently higher than the dynamics of upper body 104. In this embodiment, an onboard inner loop feedback 322 of autopilot 312 is implemented using a proportional-derivative (PD) controller 324. In this embodiment, inner loop feedback 322 has a loop time of about 3 milliseconds (ms); however, in other embodiments, the loop time of inner loop feedback 322 may vary. In this embodiment, the feedback states are the pitch and roll ($\theta$ and $\phi$) Euler angles 326 which have a bandwidth of about 10 Hz, and the p, q and r attitude rates 328. In this embodiment, yaw Euler angle is not measured or stabilized, only rate-based feedback is provided to yaw, which was found to be sufficient due to the neutrally stable nature of vertical axis positioning. An outer loop feedback 321 capability was provided for direct human piloting, and can accommodate a position tracking system should it be desired. In this embodiment, outer loop feedback 321 has a loop time of about 10 milliseconds (ms); however, in other embodiments, the loop time of outer loop feedback 321 may vary.

Still referring to FIGS. 1-9 and 18-24, an experimental prototype of the flapping-wing aircraft 100 was flight tested to compare the behavior of the flapping-wing aircraft 100 with and without the stroke mean shifting capability provided by pitch actuation assembly 220. For this reason, flight tests with the same flight profile as were flown with only the plane tilting provided by yaw actuation assembly 280 were conducted in order to have a fair comparison between the performance of the system across the two control schemes. Since one of the primary motivations of this flying platform is its hover-capability, most of the flights conducted with just the plane tilting were targeted at achieving hovering flight close to a point for as long as possible. A typical flight profile consisted of a take-off, ascent to an altitude of 6 feet (1.8 m), a loiter during which attempt was made to hover through providing control inputs, throttle adjustments, and trimming. The loiter time lasted as long as possible before (1) a battery voltage of power supply 340 dropped too low to sustain hover; (2) the flapping-wing aircraft 100 drifted outside the safe testing zone; or (3) the trim deviated substantially from that required for hover resulting in flight performance was too erratic for a pilot of flapping-wing aircraft 100 to control. Once loiter was complete, descent was initiated, and flapping-wing aircraft 100 landed. With the stroke mean shifting control technique implemented on the flapping-wing aircraft 100 via pitch actuation assembly 220, the same flight testing operation was performed, aimed at achieving and maintain hovering flight: take-off, controlled ascent, hover attempt during loiter, descend, and land. Flight test data was collected for the duration of the flight as described above.

For the flight tests conducted with the stroke mean shifting technique, the total pitch control input required for stability was divided between the two pitch control methods. In these experiments, 90% of the pitch input was sent to the pitch servo 232, and 10% was sent to the yaw servos 282. Thus for the flight experiments with the mean shifting provided by pitch actuation assembly 220, the plane tilting method provided by yaw actuation assembly 280 remained present in a very small amount. The reason for this was because it was desirable to keep a small amount of plane tilting because this would be more effective in the case that a forward or backward translation was needed to position the flapping-wing aircraft 100 in space.

Additionally, it is important to note that the process involved in developing a practically working mean shifting mechanism that would not fail under loading and also incorporate it onto the flapping-wing aircraft 100 without increasing the total weight was a non-trivial process and required many months of prototype iterations. There were a total of seven flight test conducted with a flight profile as described above. As will be discussed further herein concerning the experimental results, all of these seven flight tests with the mean shifting technique provided by pitch actuation assembly 220 are presented. Compared against this is the flight test data from thirteen flight experiments in which only the plane tilting provided by yaw actuation assembly 280 was used for pitch control.

Once flight tests were conducted with the stroke mean shifting capability provided by pitch actuation assembly 220 present on the prototype of flapping-wing aircraft 100, the pilot reported much better handling qualities. These included much more stability with smaller oscillations of flapping-wing aircraft 100 during loiter, smaller control inputs 316 needed to keep flapping-wing aircraft 100 within the confines of the flight testing area, faster time to achieve hovering flight, and significantly less effort required to maintain hovering flight. The data collected during these flight testing experiments are presented below, and seek to prove quantitatively these observations made of the flight characteristics of flapping-wing aircraft 100. If true, the addition of this control technique would be a substantial improvement over the previous technique of simply tilting previous prototypes of flapping-wing aircraft. Additionally, this would be the first mean stroke control technique implemented successfully on a flapping wing MAV. Finally, it would serve as a means of quantifying the control authority biological flyers gain from the use of this technique for pitch control.

In order to quantify the difference in performance, there are three flight states considered and then the flight qualities are compared across the two control techniques. These are the translation of the center of mass, the amplitude of the Euler pitch and roll attitude angles, and the maximum body-axis angular velocities. Each of these is discussed below, and graphs are presented comparing the variation of these flight states when 100% plane tilting was used for pitch control via yaw actuation assembly 280, versus when 90% mean shifting via pitch actuation assembly 220 and 10% plane tilting via yaw actuation assembly 280 are used for pitch control as discussed previously.

Quantifying the translation of flapping-wing aircraft 100 in the inertial space during the flight tests where the pilot of the prototype of flapping-wing aircraft 100 attempted to perform point hover, determines the hovering ability of flapping-wing aircraft 100. For a flight test in which flapping-wing aircraft 100 held hover well, it was expected that the deviation from an average position in space would be minimal. There would be less measured motion of CG 111 of flapping-wing aircraft 100, and most of the flight path could be contained within a small sphere centered at the average hover position. On the other hand, for a flight test in which flapping-wing aircraft 100 did not hover well, there would be more deviation from its average position, and a larger sphere would be required to enclose the flight path. This can be quantified by calculating the Spherical Error Probable (SEP) associated with the flight path, which is a measure of the radius of a sphere centered at the average position of flapping-wing aircraft 100 in space with the size of the SEP set such that there was a 50% probability flapping-wing aircraft 100 will be within the sphere. In other words, 50% of the flight path was contained within the sphere by considering the standard deviations of the X, Y and Z positions in space during the flight test. Here, it was of interest to normalize the SEP by loiter time. The reason for this was as follows: for very short flights, flapping-wing aircraft 100 will have a shorter amount of time to travel from its hover point, and therefore the SEP will be smaller; however, with increased time, flapping-wing aircraft 100 will have a greater opportunity to drift further and increase the SEP. Therefore, to remove the effect of flight time from the calculation, the SEP must be divided by loiter time. For the purposes of these experiments, this is referred to as Deviation velocity ($\omega$). In another words, it is the spherical radius per unit flight time.

Figure 19:
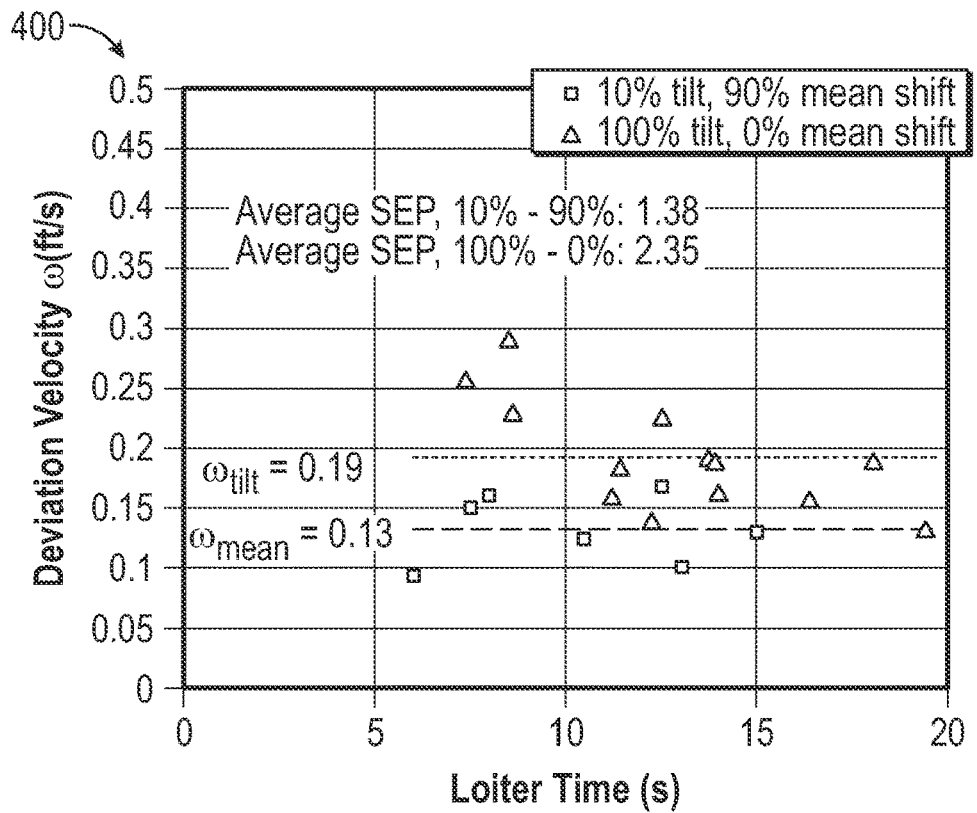
FIG. 19 is a graph illustrating deviation velocity versus loiter time for an experimental prototype of a flapping-wing aircraft.

The SEP was calculated for each of the 20 flight tests considered in this analysis, the 13 flight tests in which only flap plane tilting was used, and the 7 flight tests in which 90% stroke mean shifting and 10% plane tilting were used for pitch control. The result was then normalized by loiter time, resulting in 20 discrete values for the deviation velocities of the flight experiments. A graph 400 of FIG. 19 illustrates the calculated deviation velocities versus total loiter times for each of the flights conducted during these experiments. The mean deviation velocity for the two groups of flight experiments (plane tilting vs primarily mean shifting) was calculated and shown to the left of the data points. Additionally, the average SEP for the two groups was included on the plot as well.

The data in graph 400 illustrate several key features that demonstrate the improvement in flying qualities of the prototype of flapping-wing aircraft 100 with the inclusion of the stroke mean shifting capability provided by pitch actuation assembly 220. First, note that the average deviation velocity decreased from $\omega\_tilt=0.19$ ft/s (0.06 m/s) to $\omega\_mean=0.13$ ft/s (0.04 m/s), meaning that the mean shifting technique was able to reduce the amount flapping-wing aircraft 100 moved from its hover point over the course of the flight time by over 30%. As expected from this result, the average SEP decreased from 2.35 feet (ft.) (0.72 m) to 1.38 ft. (0.42 m), nearly half of its previous value. These results show definitively that the prototype of flapping-wing aircraft 100 was able to maintain a tighter hover than previously. Additionally, for the flight tests utilizing only plane tilting, the values of the deviation velocity vary from 0.13 ft./s (0.04 m/s) to 0.28 ft./s (0.09 m/s), but those utilizing primarily mean shifting vary only from 0.09 ft./s (0.027 m/s) to 0.17 ft./s (0.051 m/s). This result indicates much more consistency and repeatability from one flight test to the next: the flight behavior was much less erratic. Also, for the flight with lower total loiter times, there was the greatest difference in the deviation velocities, indicating that with the mean shifting technique, it takes a shorter time to achieve stable hover and maintain it. For the plane tilting only scheme, loiter times were shorter because it was difficult to achieve and maintain hover, and so the flight experiment ended sooner than other flight tests.

Another way of quantifying the translational motion of CG 111 of flapping-wing aircraft 100 was by calculating the average speed of flapping-wing aircraft 100 during loiter time. This was the magnitude of the X, Y, and Z velocities in either the body or inertial frame. For the purposes of these experiments, this will be referred to as the Drift Speed ($\Delta V$). For an ideal point hover, that speed would be zero; however, due to the nature of the system, this was difficult to achieve. Nevertheless, it was expected that the drift speed would decrease as the amount of control authority increased (a.k.a. adding mean shifting pitch control via pitch actuation assembly 220). The drift speeds of the 20 flight test experiments were calculated, as well as the average of the two groups, and are plotted on graph 402 of FIG. 20. The average drift speed decreases from 2.6 ft./s (0.8 m/s) to 1.38 ft./s (0.42 m/s) with the inclusion of the mean shifting. This explains why the pilot of flapping-wing aircraft 100 reported during the experiments that it was much easier to maintain hover because the mean velocity decreased by 47%. Additionally, as noted above, the absolute spread in the data points for the flight tests with only plane tilting was significantly more than that of the mean shifting. That value decreases from ~2 ft./s (0.61 m/s) to ~1 ft./s (0.3 m/s). Another item to note from graph 402 is the fact that there are a couple of data points from the plane tilting experiments that are within the upper region of the data points from the mean shifting experiments. This means that it was possible to reach a similar level of performance with just plane tilting.

Besides the motion of CG 111 of flapping-wing aircraft 100 within the flight testing space during loiter, the attitude was also of interest in order to characterize the rigid body motion of flapping-wing aircraft 100 under the control of the two different pitching schemes. The best method for quantifying the difference in attitude behavior between the two flight testing groups was by calculating the maximum peak-to-peak amplitude for each of the tests. That is, finding half the difference between the maximum and minimum attitude angle values essentially reveals the amplitude of the oscillations during the test flight. For this analysis, the roll and pitch Euler angles are of interest, especially the pitch Euler angle. Yaw Euler angle was simply the heading of flapping-wing aircraft 100 and, being neutrally stable, was of little importance in quantifying the flight performance with different pitch control techniques.

Figure 20:
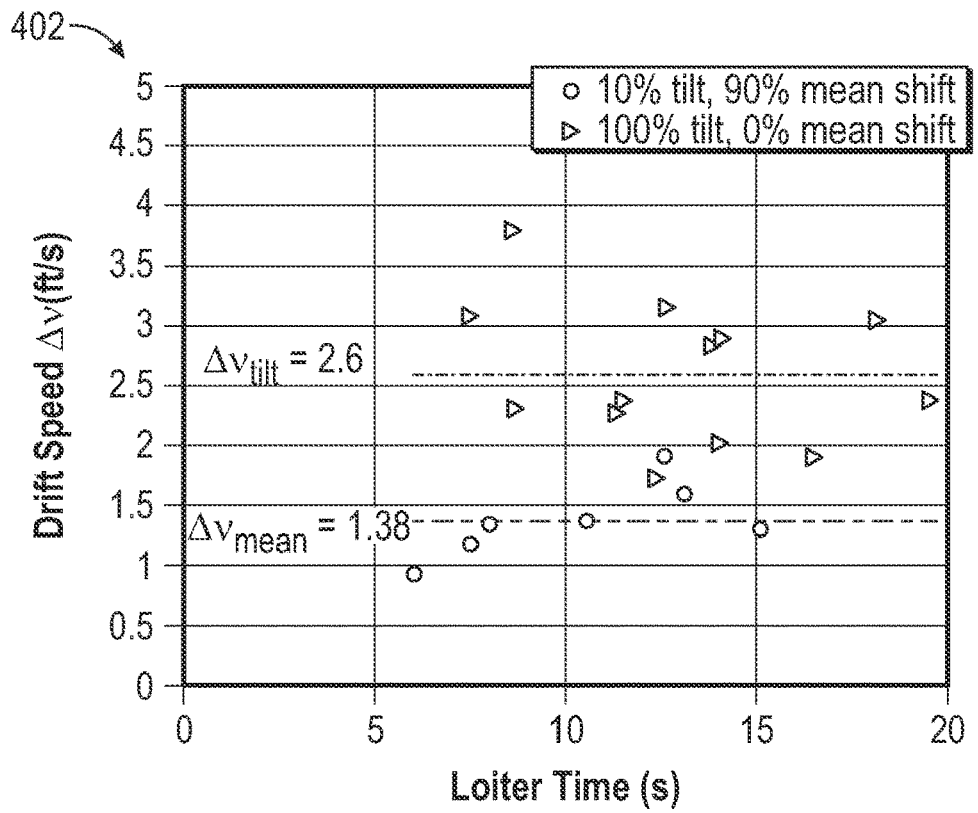
FIG. 20 is a graph illustrating drift speed versus loiter time for an experimental prototype.
Figure 21:
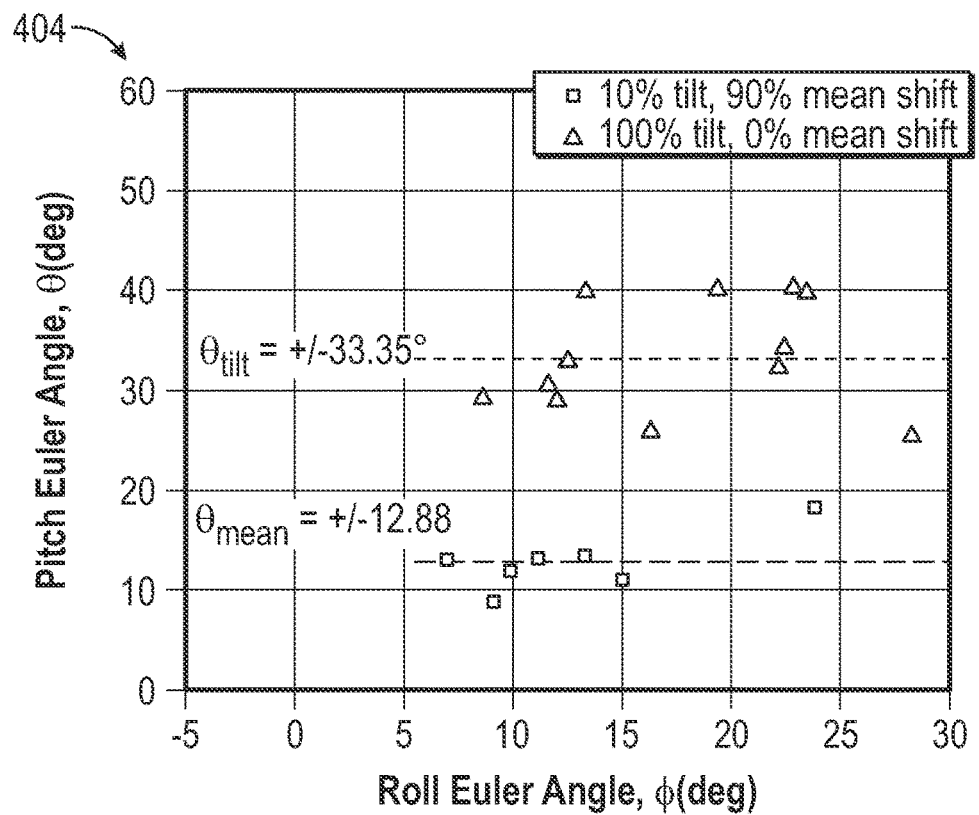
FIG. 21 is a graph illustrating pitch Euler angle versus roll Euler angle for the experimental prototype.
Figure 22:
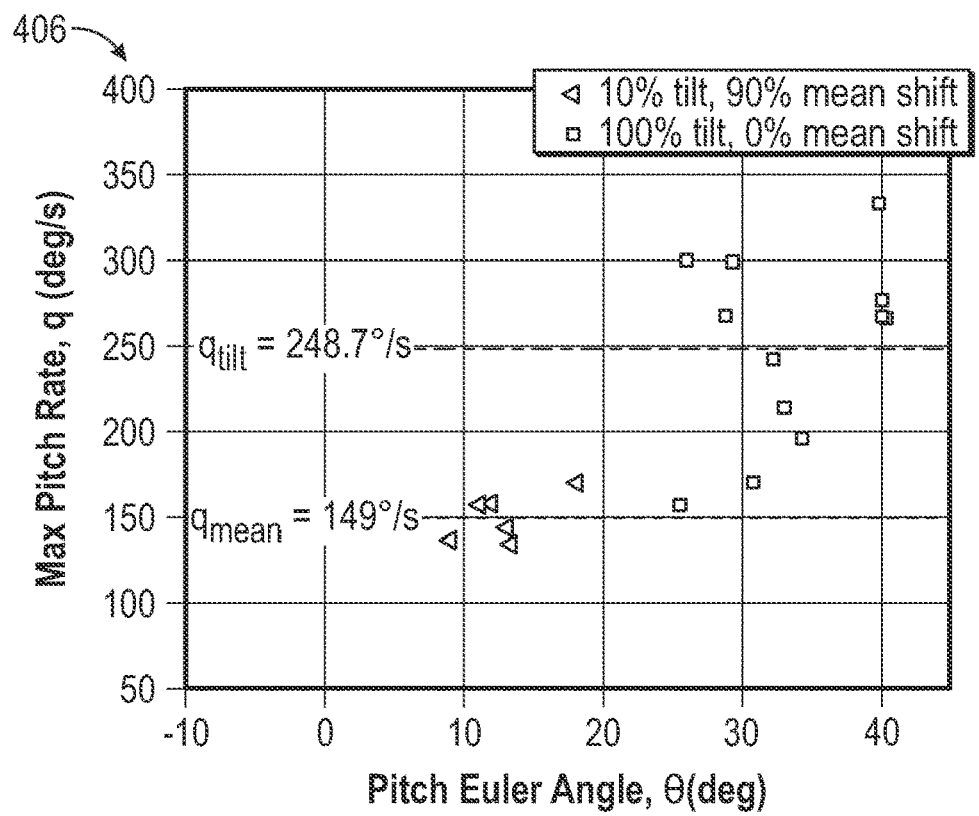
FIG. 22 is a graph illustrating max pitch rate versus pitch Euler angle for the experimental prototype.
Figure 23:
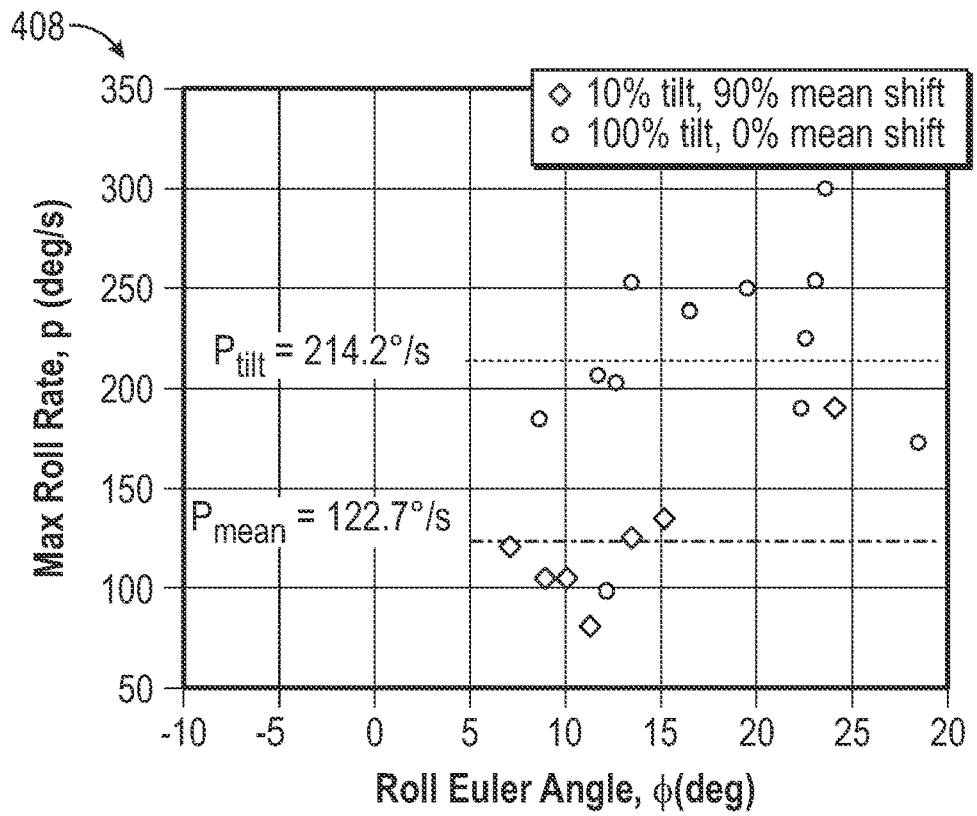
FIG. 23 is a graph illustrating max roll rate versus roll Euler angle for the experimental prototype.
Figure 24:
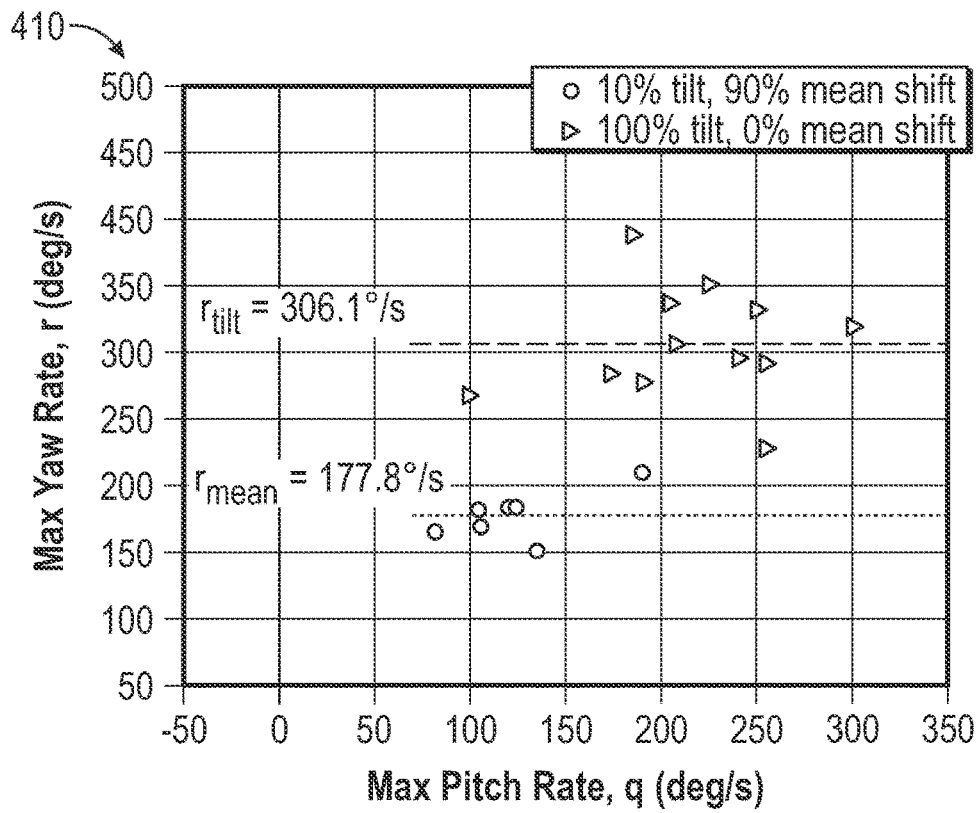
FIG. 24 is a graph illustrating max yaw rate versus max pitch rate for the experimental prototype.

For each of the 20 flight tests, the maximum amplitude of oscillation in pitch and roll during loiter in +/−degrees was calculated from the flight test data, the results of which are illustrated in graph 404 of FIG. 20. Particularly graph 404 shows pitch Euler angle amplitude in degrees on the y-axis versus roll Euler angle amplitude in degrees on the x-axis. The average pitch Euler angle amplitude was calculated for the two groups of flight test data, the 13 flight test in which only plane tilting was used for pitch control, and also for the 7 flight tests using mostly mean shifting. As shown in graph 404, the average pitch Euler angle amplitude of oscillation decreased from ±33.5° to ±12.88°, meaning that the attitude was under better control with the inclusion of the mean shifting control. Also, several flight tests using only the plane tilting method had maximum roll Euler angle amplitudes there were similar to the flight tests with the mean shifting added. This was the region from ±6° to ±15° on the x-axis. This was to be expected, since there was no change made in the roll control scheme, and therefore more similarity should be measured between the two flight test groups. However, on average there was an improvement in the maximum roll Euler angle oscillations with the mean shifting, which may be due to coupling between the longitudinal and lateral modes in the natural flight dynamics as has been shown in linear flight dynamics identification of the previous prototype of the prototype of flapping-wing aircraft 100. For the same amplitude of roll Euler angle oscillations between the two pitch control schemes, the amplitude of pitch angle oscillations nearly doubles when only the plane tilting method was implemented. This quantitatively demonstrates the reports from the pilot that the reason flapping-wing aircraft 100 was difficult to fly was due to the fact that the pitch was marginally stable, essentially on the precipice of divergence.

Another consideration from graph 404 is the relative control authority between roll and pitch degrees of freedom. If control authority is defined based on the amplitude of Euler angle oscillation, then for a system with equal levels of control authority in pitch and roll, the maximum amplitude of both pitch and roll Euler angles would be theoretically the same. With the mean shifting technique incorporated, the roll Euler angle amplitude varies mostly in the region of ±6° to ±15°, while the pitch Euler angle varies within ±9° to ±15°, indicating that with the mean shifting technique implemented via pitch actuation assembly 220, the control authority was now essentially the same. Intuitively, this makes sense, because with the mean shifting method employed, movement of ACs 187 of wings 180A, 180B relative to CG 111 was used for controlling both the longitudinal and lateral degrees of freedom.

The body axis rotational velocities are considered in this discussion. They are of interest since a considerable amount of effort was put forth by the controller in order to stabilize the rates of flapping-wing aircraft 100 during flight. During flight, the body axis rates were measured on board flapping-wing aircraft 100 with the tri-axial gyros on autopilot 312. Autopilot 312 was aligned with the upper body 104 of flapping-wing aircraft 100 for reference, so the conventional rates, p, q, and rare measured directly in flight. For the 20 flight tests under consideration in this analysis, the body axis rates data was taken from the flight test data. The maximum values for each of the rates were extracted from this data, resulting in 20 discreet points for the flight tests for each of the three body rates, totaling 60 data points. The most insightful method to represent this data was to compare the maximum rates against their respective Euler angles. This was done with the pitch rate and Euler angle, and also with the roll rate and Euler angle as shown in graph 406 of FIG. 22 and graph 408 of FIG. 23, respectively. In graphs 406 and 408 the maximum body axis rate was plotted on the vertical axis, and the amplitude of attitude angle oscillations was plotted on the horizontal axis (the same concept as plotted in graph 404 of FIG. 21). Additionally, the average of the maximum pitch and roll rates for the two groups of data (with and without mean shifting) are calculated and shown on the left side of each of graphs 406, 408.

For the pitch rate, q, versus pitch Euler angle amplitude shown in graph 408, the average maximum pitch rate dropped by 40% from 248.7°/s to 149°/s with the inclusion of the mean shifting control technique provided by pitch actuation assembly 220, and the spread in data was significantly reduced. In fact, the relationship between pitch rate and pitch Euler angle was essentially a constant value of 12.5/s with the mean shifting method included in the pitch control. On the other hand when using only plane tilting provided by yaw actuation assembly 280, the behavior of the system was generally erratic and uncontrolled. Second, for roll rate p versus roll Euler angle amplitude shown in graph 410 of FIG. 24, the average maximum roll rate dropped by just over 40% from 214.2°/s to 122.7°/s with the inclusion of the mean shifting pitch control technique. However, this does lend credence to the result from a linear flight dynamics identification study with the prototype of flapping-wing aircraft 100, which concluded that longitudinal and lateral modes were coupled on the two-winged, hover-capable system.

For the yaw rate r, it was not necessarily insightful to compare this against yaw Euler angle, since, as mentioned above, the yaw Euler angle was simply indicative of flapping-wing aircraft 100 heading, can be changed rapidly and at will by the pilot and was neutrally stable. However, the yaw degree of freedom was also controlled via flap plane tilting provided by yaw actuation assembly 280. Therefore it was coupled to the pitch degree of freedom via the control mechanism for the case in which plane tilting was used for pitch control. As such, it was expected that by utilizing a mean shifting technique via pitch actuation assembly 220 for pitch control instead of plane tilting, the yaw rates and deviations throughout the flight would decrease, since the planes are being tilted less. Therefore, the maximum yaw rate r was compared against the maximum pitch rate, q, for each of the 20 flight experiments under consideration, which are illustrated in graph 410 of FIG. 24. Also included is the average maximum yaw rate for the two groups of flight test results. Similar to the results indicated in graphs 406 and 408, the maximum yaw rate decreases by 40% with the use of mean shifting instead of flap plane tilting. Similar to the results with the pitch rate versus pitch Euler angle, the relationship between the yaw rate and pitch rate was virtually a constant value of 1.5 for the mean shifting technique because the spread was so little. Also, the average maximum value for the yaw rate with the mean shifting control technique was about 177.8°/s, but the average maximum values for the pitch and roll rates shown in graphs 406, 408 were about 149°/s and 122.7°/s, respectively. The magnitude of the feedback used to regulate the yaw rate resulted in the maximum yaw rate being higher than for the pitch and roll rates when yaw was neutrally stable, not unstable like pitch and roll. The gain values used in the feedback loop for yaw were about half of those used to regulate pitch and roll, meaning that the yaw rate was comparatively less regulated than pitch and roll. Since yaw was neutrally stable, it was a small task to re-adjust the heading of the prototype of flapping-wing aircraft 100 during flight if there was a rate causing the heading to drift. Also, each of the actuators required power from power supply 340 in order to operate. Because of the limited power available on board flapping-wing aircraft 100, it was desired to reserve this for motor 122 which required a significant amount of power. By turning down the gains for yaw, it minimized the total power required by servos 232 and left more for motor 122.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A flapping-wing aircraft, comprising:
   a support frame;
   a motor coupled to the support frame;
   a pair of wings coupled to the support frame; and
   a linkage assembly coupled to the support frame and configured to translate an output torque of the motor into flapping motion of the wings, wherein the linkage assembly comprises:
     a first link coupled to a rotational output of the motor;
     a second link pivotably coupled to the first link at a first pivot joint;
     a third link pivotably coupled to the second link at a second pivot joint and pivotably coupled to the support frame at a third pivot joint, wherein the third link is pivotable about the third pivot joint at a first stroke amplitude; and
     a fourth link pivotably coupled to the support frame at a fourth pivot joint and slidably coupled to the third link, wherein the fourth link is coupled to a first wing of the pair of wings and wherein the fourth link is pivotable about the fourth pivot joint at a second stroke amplitude that is greater than the first stroke amplitude.

2. The flapping-wing aircraft of claim 1, wherein an end of the third link comprises a slider through which the fourth link extends.

3. The flapping-wing aircraft of claim 1, further comprising:
   a yaw actuation assembly coupled to the support frame and configured to adjust a yaw moment about a vertical axis extending through a center of gravity of the flapping-wing aircraft;
   wherein the yaw actuation assembly comprises a yaw servo and a wing mount coupled to the first wing, and wherein the yaw servo is configured to rotate the wing mount about a pitch axis.

4. The flapping-wing aircraft of claim 1, further comprising a pitch actuation assembly coupled to the support frame and configured to adjust a pitch moment about a lateral axis of the flapping-wing aircraft, wherein the pitch actuation assembly comprises:
   a pivot shaft comprising having a rotational axis and comprising an offset shaft having an offset axis that is spaced from the rotational axis, wherein the third pivot joint is coupled to the offset shaft;
   a swing arm coupled to the support frame;
   a pitch yolk coupled between the swing arm and the pivot shaft;
   wherein the pivot shaft is configured to adjust an offset between an aerodynamic center of the first wing and the lateral axis in response to rotation of the swing arm.

5. The flapping-wing aircraft of claim 1, wherein the fourth pivot joint comprises a wing root of the first wing, and wherein the first wing comprises:
   a leading edge spar extending from the wing root;
   a flexible shim coupled to the wing root;
   a root spar coupled to the flexible shim, wherein the root spar comprises a material having a greater stiffness than a material comprising the flexible shim; and
   a flexible skin stretched over the leading edge spar and the root spar.

6. The flapping-wing aircraft of claim 3, wherein the yaw actuation assembly further comprises:
   a swing arm coupled to a yaw servo that is coupled to the support frame; and
   a pair of pitch links coupled between the swing arm and the wing mounts;
   wherein the pitch links are configured to rotate the wing mount about the pitch axis in response to rotation of the swing arm.

7. The flapping-wing aircraft of claim 1, wherein each of the pair of wings comprises:

a wing root coupled to the linkage assembly;
a leading edge spar extending from the wing root;
a flexible shim coupled to the wing root;
a root spar coupled to the flexible shim, wherein the root spar comprises a material having a greater stiffness than a material comprising the flexible shim; and
a flexible skin stretched over the leading edge spar and the root spar.

8. A flapping-wing aircraft, comprising:
a support frame;
a motor coupled to the support frame;
a pair of wings coupled to the support frame; and
a linkage assembly coupled to the support frame and configured to translate an output torque of the motor into flapping motion of the wings, wherein the linkage assembly comprises:
 a first link coupled to a rotational output of the motor;
 a second link pivotably coupled to the first link at a first pivot joint;
 a third link pivotably coupled to the second link at a second pivot joint; and
 a fourth link pivotably coupled to the support frame and slidably coupled to the third link, wherein the fourth link is coupled to a first wing of the pair of wings;
a yaw actuation assembly coupled to the support frame and configured to adjust a yaw moment about a vertical axis extending through a center of gravity of the flapping-wing aircraft;
wherein the yaw actuation assembly comprises a yaw servo and a wing mount coupled to the first wing, and wherein the yaw servo is configured to rotate the wing mount about a pitch axis.

9. The flapping-wing aircraft of claim 8, further comprising:
a roll actuation assembly coupled to the support frame and configured to adjust a roll moment about a longitudinal axis of the flapping-wing aircraft, wherein the roll actuation assembly comprises:
 a roll servo coupled to the support frame;
 a roll swing arm coupled to the roll servo;
 a roll bar coupled to the roll swing arm and to a wing mount coupled to the first wing, wherein the roll bar and the wing mount are each slidable along a longitudinal axis of the roll bar in response to rotation of the roll swing arm.

10. The flapping-wing aircraft of claim 8, further comprising:
a pitch actuation assembly coupled to the support frame and configured to adjust a pitch moment about a lateral axis of the flapping-wing aircraft, wherein the pitch actuation assembly comprises:
 a pivot shaft comprising having a rotational axis and comprising an offset shaft having an offset axis that is spaced from the rotational axis, wherein the third pivot joint is coupled to the offset shaft;
 a swing arm coupled to the support frame;
 a pitch yolk coupled between the swing arm and the pivot shaft;
 wherein the pivot shaft is configured to adjust an offset between an aerodynamic center of the first wing and the lateral axis in response to rotation of the swing arm.

11. A flapping-wing aircraft, comprising:
a support frame;
a motor coupled to the support frame;
a pair of wings coupled to the support frame; and
a linkage assembly coupled to the support frame and configured to translate an output torque of the motor into flapping motion of the wings, wherein the linkage assembly comprises:
 a first link coupled to a rotational output of the motor;
 a second link pivotably coupled to the first link at a first pivot joint;
 a third link pivotably coupled to the second link at a second pivot joint; and
 a fourth link pivotably coupled to the support frame and slidably coupled to the third link, wherein the fourth link is coupled to a first wing of the pair of wings;
a pitch actuation assembly coupled to the support frame and configured to adjust a pitch moment about a lateral axis of the flapping-wing aircraft, wherein the pitch actuation assembly comprises:
 a pivot shaft comprising having a rotational axis and comprising an offset shaft having an offset axis that is spaced from the rotational axis, wherein the third pivot joint is coupled to the offset shaft;
 a swing arm coupled to the support frame;
 a pitch yolk coupled between the swing arm and the pivot shaft;
 wherein the pivot shaft is configured to adjust an offset between an aerodynamic center of the first wing and the lateral axis in response to rotation of the swing arm.

12. The flapping-wing aircraft of claim 11, further comprising:
a roll actuation assembly coupled to the support frame and configured to adjust a roll moment about a longitudinal axis of the flapping-wing aircraft, wherein the roll actuation assembly comprises:
 a roll servo coupled to the support frame;
 a roll swing arm coupled to the roll servo;
 a roll bar coupled to the roll swing arm and to a wing mount coupled to the first wing, wherein the roll bar and the wing mount are each slidable along a longitudinal axis of the roll bar in response to rotation of the roll swing arm.

13. The flapping-wing aircraft of claim 11, further comprising:
a yaw actuation assembly coupled to the support frame and configured to adjust a yaw moment about a vertical axis extending through a center of gravity of the flapping-wing aircraft;
wherein the yaw actuation assembly comprises a yaw servo and a wing mount coupled to the first wing, and wherein the yaw servo is configured to rotate the wing mount about a pitch axis.

14. A flapping-wing aircraft, comprising:
a support frame;
a motor coupled to the support frame;
a pair of wings coupled to the support frame; and
a linkage assembly coupled to the support frame and configured to translate an output torque of the motor into flapping motion of the wings, wherein the linkage assembly comprises:
 a first link coupled to a rotational output of the motor;
 a second link pivotably coupled to the first link at a first pivot joint;
 a third link pivotably coupled to the second link at a second pivot joint; and
 a fourth link pivotably coupled to the support frame and slidably coupled to the third link, wherein the fourth link is coupled to a first wing of the pair of wings;

a roll actuation assembly coupled to the support frame and configured to adjust a roll moment about a longitudinal axis of the flapping-wing aircraft, wherein the roll actuation assembly comprises:
  a roll servo coupled to the support frame;
  a roll swing arm coupled to the roll servo;
  a roll bar coupled to the roll swing arm and to a wing mount coupled to the first wing, wherein the roll bar and the wing mount are each slidable along a longitudinal axis of the roll bar in response to rotation of the roll swing arm.

15. The flapping-wing aircraft of claim 14, further comprising:
  a yaw actuation assembly coupled to the support frame and configured to adjust a yaw moment about a vertical axis extending through a center of gravity of the flapping-wing aircraft;
  wherein the yaw actuation assembly comprises a yaw servo and a wing mount coupled to the first wing, and wherein the yaw servo is configured to rotate the wing mount about a pitch axis.

16. The flapping-wing aircraft of claim 14, further comprising:
  a pitch actuation assembly coupled to the support frame and configured to adjust a pitch moment about a lateral axis of the flapping-wing aircraft, wherein the pitch actuation assembly comprises:
    a pivot shaft comprising having a rotational axis and comprising an offset shaft having an offset axis that is spaced from the rotational axis, wherein the third pivot joint is coupled to the offset shaft;
    a swing arm coupled to the support frame;
    a pitch yolk coupled between the swing arm and the pivot shaft;
    wherein the pivot shaft is configured to adjust an offset between an aerodynamic center of the first wing and the lateral axis in response to rotation of the swing arm.

\* \* \* \* \*